United States Patent
Bischof

(10) Patent No.: US 12,240,586 B2
(45) Date of Patent: Mar. 4, 2025

(54) AIRCRAFT FUSELAGE AND MODULE FOR ABSORBING CRASH ENERGY IN A LOWER DECK, USED FOR TRANSPORTING PASSENGERS, OF AN AIRCRAFT

(71) Applicant: Airbus Operations GmbH, Hamburg (DE)

(72) Inventor: Olaf Bischof, Butjadingen (DE)

(73) Assignee: Airbus Operations GmbH, Hamburg (DE)

( * ) Notice: Subject to any disclaimer, the term of this patent is extended or adjusted under 35 U.S.C. 154(b) by 78 days.

(21) Appl. No.: 18/127,905

(22) Filed: Mar. 29, 2023

(65) Prior Publication Data

US 2023/0249797 A1 Aug. 10, 2023

Related U.S. Application Data

(62) Division of application No. 16/173,971, filed on Oct. 29, 2018, now Pat. No. 11,628,921.

(30) Foreign Application Priority Data

Oct. 30, 2017 (DE) .......................... 102017125498-6

(51) Int. Cl.
| | |
|---|---|
| *B64C 1/06* | (2006.01) |
| *B64C 1/00* | (2006.01) |
| *B64C 1/18* | (2006.01) |

(52) U.S. Cl.
CPC ................ *B64C 1/18* (2013.01); *B64C 1/062* (2013.01); *B64C 2001/0027* (2013.01)

(58) Field of Classification Search
CPC .......... B64C 1/062; B64C 2001/0027
See application file for complete search history.

(56) References Cited

U.S. PATENT DOCUMENTS

| 8,123,166 B2 | 2/2012 | Meyer |
|---|---|---|
| 9,090,331 B2 | 7/2015 | Fitzsimmons |
| (Continued) | | |

FOREIGN PATENT DOCUMENTS

| DE | 102010014638 A1 | 10/2011 |
|---|---|---|
| DE | 10202013105503 U1 | 9/2014 |
| (Continued) | | |

OTHER PUBLICATIONS

German Search Report for Application No. 102017125498 dated Feb. 14, 2018.

(Continued)

*Primary Examiner* — Nicholas McFall
(74) *Attorney, Agent, or Firm* — KDW Firm PLLC

(57) ABSTRACT

A module an aircraft fuselage includes a support device including a lower end for connection to a fuselage structure in a lower deck of the fuselage, an upper end for connection to an intermediate floor in the fuselage, and an energy absorption element between the upper end and the lower end. A wall panel is connected to the support device and extends along a longitudinal axis and a circumferential direction. In case of a defined crash of an underside of the aircraft fuselage, the energy absorption element is configured to undergo a defined plastic deformation and absorb a defined amount of kinetic energy of that a part of the fuselage structure connected to the lower end of the support device. The plastic deformation and amount of absorbed energy are of a magnitude that in case of defined crash, the module is configured where the fuselage structure will, at the underside of the aircraft fuselage, deform no more than a minimum height.

20 Claims, 15 Drawing Sheets

(56) References Cited

U.S. PATENT DOCUMENTS 9,162,745 B2    10/2015  Mayer et al.
2019/0135406 A1  5/2019  Bischof

FOREIGN PATENT DOCUMENTS

DE    102009020891 B4   5/2015
DE    102010062018 B4   5/2015
DE    102010027859 B4   11/2017
FR         2936218 A1   3/2010

OTHER PUBLICATIONS

Serman Office Action for Application No. 102017125498 dated Sep. 12, 2018.
Chinese First Office Action for CN Application No. 201811279033.9, dated Sep. 9, 2024, 8 pages.

AIRCRAFT FUSELAGE AND MODULE FOR ABSORBING CRASH ENERGY IN A LOWER DECK, USED FOR TRANSPORTING PASSENGERS, OF AN AIRCRAFT

CROSS-REFERENCE TO RELATED APPLICATION

This application is a divisional of and claims priority to U.S. patent application Ser. No. 16/173,971 filed Oct. 29, 2018, which claims priority to German Patent Application DE 10 2017 125 498.6 filed Oct. 30, 2017, the entire disclosure of which is incorporated by reference herein.

TECHNICAL FIELD

The present disclosure relates, in a first aspect, to an aircraft fuselage for transporting passengers in a lower deck, having a fuselage structure which extends in tubular fashion along a longitudinal axis and which surrounds an interior compartment. The aircraft fuselage has an intermediate floor which is fastened to the fuselage structure, extends through the interior compartment and divides the interior compartment into an upper deck and a lower deck. The aircraft fuselage has finally a support device for supporting the intermediate floor on the fuselage structure, wherein the support device is fastened by an upper end to the intermediate floor and by an opposite, lower end in the lower deck to the fuselage structure. In a second aspect, the present disclosure relates to a module having a support device.

BACKGROUND

The upper deck in aircraft is typically used for transporting passengers, and the lower deck normally serves as a freight compartment.

A further important task of the lower deck is to provide a crumple zone for the upper deck for the situation of a crash of the underside of the aircraft fuselage. For this situation, the lower deck has support devices, which are known in the prior art and which are designed or configured to absorb a part of the kinetic energy of the underside of the aircraft fuselage and to convert the kinetic energy by plastic deformation. As a result of the deformation of the support devices and of the fuselage structure in the lower region of the aircraft fuselage, the acceleration forces that are exerted on the passengers in the upper deck as a result of the crash because of the abrupt decrease in speed are considerably reduced. In this way, physical injury to the passengers is minimized.

Normally, in the prior art, use is made of linearly configured support devices, that is to say support devices which have a supporting element in a direct connecting line between two ends. Such a linear support device forms a direct support between the intermediate floor and that section of the aircraft fuselage to which the support device is generally connected. In the event of a crash, the support devices thus cannot prevent or significantly decelerate a relative movement between the aircraft fuselage and the intermediate floor.

To increase the transport capacities for passengers, it is desirable to also utilize the lower deck for the transport of passengers and to be able to transport passengers there.

This type of utilization of the lower deck is however problematic. Firstly, even in the case of the lower deck being utilized as a passenger compartment, it must be ensured that the function of the lower deck as a crumple zone in the event of a crash of the underside of the aircraft fuselage is still provided. The linearly configured support devices used for this purpose in the prior art have the disadvantage that, because of their arrangement in that region of the side regions of the lower deck which is close to the fuselage, they greatly restrict an arrangement of passenger seats and thus considerably reduce the number of passengers that can be transported.

Furthermore, it must be ensured that passengers in the lower deck can survive the crash. For this purpose, the support device must be dimensioned, in terms of its capability for converting kinetic energy into a plastic deformation, such that a minimum height of the lower deck exists during and after a crash in the lower deck. The support devices hitherto used in the prior art lack corresponding dimensioning, that is to say lack the capability of dampening the kinetic energy from a crash such that a minimum height exists in the lower deck after the crash. It is rather the case in the known aircraft fuselages that the lower deck can substantially collapse in order to absorb the kinetic energy that arises.

SUMMARY

It is therefore an object of the present disclosure to provide an aircraft fuselage which provides a maximum utilizable space for passengers in the lower deck and which, at the same time, in the event of a crash, absorbs kinetic energy such that the passengers can survive and a minimum height of the lower deck is not undershot.

The present object is achieved, according to a first aspect of the disclosure herein, by an aircraft fuselage for transporting passengers in a lower deck.

In the case of the aircraft fuselage for transporting passengers in a lower deck according to the first aspect of the disclosure herein, the support device has a concave form as viewed from the longitudinal axis to the fuselage structure, and has an energy absorption element between the upper end and the lower end. The energy absorption element is designed such that, in the event of a defined crash of an underside of the aircraft fuselage, the energy absorption element undergoes a defined plastic deformation and, in so doing, absorbs a defined amount of kinetic energy of that part of the fuselage structure which is connected to the lower end of the support device. The defined plastic deformation and the defined amount of absorbed energy are selected such that, in the event of the crash, the fuselage structure is, at the underside of the aircraft fuselage, deformed at most to such an extent that a minimum height between a seat surface of passenger seats provided in the lower deck and the intermediate floor is not undershot.

In other words, the aircraft fuselage according to the first aspect of the disclosure herein has a fuselage structure. Here, the fuselage structure has the form of a tube, though may also be a passenger region of a flying-wing aircraft. A flying-wing aircraft is an aircraft without a separately projecting elevator unit, vertical stabilizing fins or a rudder unit. The tubular fuselage structure may have, or be formed from, transverse and longitudinal stiffening elements. Both the transverse and the longitudinal stiffening elements increase the stability and stiffness of the fuselage structure. Transverse stiffening elements may be ribs which are arranged substantially in a circumferential direction of the tubular fuselage structure. Longitudinal stiffening elements may be so-called stringers, which are arranged substantially along an axis perpendicular to the circumferential direction, that is to say a central longitudinal axis (also referred to as central axis) of the fuselage structure. The fuselage structure may furthermore have an outer skin which spatially divides an interior compartment of the fuselage structure, that is to say a cabin interior compartment, from the external surroundings of the fuselage structure.

Furthermore, the aircraft fuselage has an intermediate floor, also referred to as cabin floor. This intermediate floor extends horizontally through the interior compartment of the fuselage structure and divides the interior compartment of the cabin, preferably at least in sections, into an upper deck and a lower deck. The upper deck is in this case preferably arranged above the lower deck. The intermediate floor is furthermore fastened to the fuselage structure, that is to say, for example, to the longitudinal and/or transverse stiffening elements. The upper deck may in this case be designed as a cabin with seats for passengers. The lower deck may be configured as a freight compartment for transporting luggage belonging to the passengers and/or goods.

Furthermore, a support device is provided in the lower deck. The support device may have at least one first support element. The support device has an upper end and a lower end. The upper end of the support device is fastened to the intermediate floor. The lower end of the support device is fastened to a section of the fuselage structure in the lower deck. Here, the upper end of the support device is situated opposite the lower end of the support device. For example, the support device may be fastened to a transverse and/or longitudinal stiffening element. The lower end, fastened to the fuselage structure, of the support device forms a counterbearing of the support device, whereby the support device can support the intermediate floor.

The support device may be designed in a variety of ways. For example, the support device may have one, two or a multiplicity of support elements. The support elements may, for example, be designed as struts and have an upper and a lower end. Here, a strut may describe an element which has a spatial extent or a size which corresponds to the spatial extent of a transverse and/or longitudinal stiffening element or a multiple thereof. The upper ends of the support elements may each be fastened to the intermediate floor. The lower ends of the support elements may each be fastened to a section of the fuselage structure in the lower deck. For example, the support elements may each be fastened to one or more transverse and/or longitudinal stiffening elements. The support elements may be arranged in the two end regions of the lower deck, that is to say in the region of the lower deck adjacent to the outer skin.

It is, however, also conceivable for the support device to have one, two or a multiplicity of panel-like support elements, that is to say support elements in the form of panels. A panel-like support element may be a support element which has both an extent in a circumferential direction and an extent in a longitudinal axis of the fuselage structure. For example, a panel-like support element may have an extent in a longitudinal axis of the aircraft fuselage which lies in the range of the spacing of the transverse stiffening elements or one or more multiples thereof. Furthermore, the panel-like support element may have an extent in a circumferential direction of the aircraft fuselage which lies in the range of the spacing of longitudinal stiffening elements or one or more multiples thereof. Finally, it is conceivable for a multiplicity of panel-like support elements to be arranged in the lower deck and to support the intermediate floor. The panel-like support elements may each also have an upper and a lower end. Here, the upper ends of the support elements may each be fastened to the intermediate floor. The lower ends of the support elements may each be fastened to a section of the fuselage structure in the lower deck. For example, the support elements may each be fastened to one or more transverse and/or longitudinal stiffening elements. The support elements may be arranged in the two end regions of the lower deck, that is to say in the region of the lower deck adjacent to the outer skin.

The support device has a form which is concave as viewed from the longitudinal axis of the fuselage structure. A concave form means that the support device preferably has a region between the lower and upper ends which runs not linearly but non-linearly. In particular, the support device may be kinked or curved towards the fuselage structure and thus kinked or curved away from the longitudinal axis of the aircraft fuselage.

Furthermore, the support device has an energy absorption element between the upper end and the lower end. The energy absorption element may, for example, be arranged in a defined local region between the upper end of the support device and the lower end of the support device. It is however also conceivable for the energy absorption element to extend from the upper end towards the lower end and thus globally over more than half or even the entire support device. The energy absorption element is designed for absorbing kinetic energy, in particular energy from a crash. Here, a crash describes an event in which the aircraft fuselage or the fuselage structure is subjected, at least in a region of its underside, to a force which is directed at least partially in the direction of the longitudinal axis of the aircraft fuselage. Examples of a crash are, for example, the landing of the aircraft having the aircraft fuselage according to the disclosure herein without deployed landing gear.

For the simulation of such a real crash, that is to say for the analysis of a crash, a defined vertical drop of a typical fuselage section onto its underside is considered. This typical fuselage section comprises a number of seat rows, but has neither doors nor other structural constituents such as a center wing box or landing gear well. The lowest point of the fuselage impacts first. There are various falling speeds, for example 25 ft/sec, and a combination of different loading states, from full to empty, in each case in the lower and in the upper deck. A crash in accordance with approval reference CS25 ATA 024 CS 25.561 is preferably considered.

The energy absorption element is designed such that, in the event of a defined crash of an underside of the aircraft fuselage, the energy absorption element absorbs a defined amount of kinetic energy. The kinetic energy originates from that part of the fuselage structure which is connected to the lower end of the support device. In absorbing kinetic energy from a crash, the energy absorption element undergoes a defined plastic deformation. Here, a plastic deformation describes a conversion of the kinetic energy from the crash into some other form of energy, such as, for example, deformation energy or heat.

The defined amount of energy absorbed by the energy absorption element is selected such that, in the event of the crash of the fuselage structure at the underside of the aircraft fuselage, the lower deck is not fully deformed. The lower deck is deformed at most such that the lower deck has a minimum height during and after the crash. Here, the minimum height describes the height or the vertical distance between a seat surface of a passenger seat arranged in the lower deck and the intermediate floor. This minimum height normally lies between 1.60 meters and 2.00 meters, preferably 1.80 meters, and must not be undershot in the event of a crash. By the minimum height of the lower deck, a "survival space" for the passengers situated in the lower deck remains present in any case in the event of a crash, and thus improves the survival chances of the passengers.

The aircraft fuselage according to the first aspect of the disclosure herein has substantially two advantages. Firstly, the concave form of the support device makes it possible for the space in the lower deck to be utilized more efficiently than the conventional linear support devices used in the prior art. It is thus possible for a maximum area of the lower deck to be equipped with passenger seats. Furthermore, because of the capability of the support device to absorb kinetic energy from a crash and thus prevent a movement of the fuselage structure as far as the intermediate floor, the likelihood of survival of the passengers transported in the lower deck is greatly increased. This arises in particular from the formation of the "survival space" defined by the minimum height and formed during the crash.

In an embodiment according to the first aspect of the disclosure herein, the support device has multiple support elements situated in succession in the direction of the longitudinal axis.

The support elements are preferably spaced apart from one another, and preferably uniformly. In this case, the support elements may be designed as bars or struts with an upper and a lower end. A bar or a strut may in this case describe an element which has a spatial extent or a size which corresponds to the spatial extent of a transverse and/or longitudinal stiffening element or a multiple thereof. The upper ends of the support elements may each be fastened to the intermediate floor. The lower ends of the support elements may each be fastened to a section of the fuselage structure in the lower deck. For example, the support elements may each be fastened to one or more transverse and/or longitudinal stiffening elements. The support elements may be arranged in the two end regions or sides of the lower deck, that is to say in the region of the lower deck adjacent to the outer skin, and thus to the left and right of the longitudinal axis of the aircraft fuselage.

It is however also conceivable for the support elements to adjoin one another, for example in the form of areal structures such as panels. Such a panel-like support element may be a support element which has both an extent in a circumferential direction and an extent in a longitudinal axis of the fuselage structure. For example, a panel-like support element may have an extent in a longitudinal axis of the aircraft fuselage which lies in the range of the spacing of the transverse stiffening elements or multiples thereof. Furthermore, the panel-like support element may have an extent in a circumferential direction of the aircraft fuselage which lies in the range of the spacing of longitudinal stiffening elements or multiples thereof. Finally, it is conceivable for a multiplicity of panel-like support elements to be arranged in the lower deck and to support the intermediate floor. The panel-like support elements may also each have an upper and a lower end. Here, the upper ends of the support elements may each be fastened to the intermediate floor. The lower ends of the support elements may each be fastened to a section of the fuselage structure in the lower deck. For example, the support elements may each be fastened to one or more transverse and/or longitudinal stiffening elements. The support elements may be arranged in the two end regions of the lower deck, that is to say in the region of the lower deck adjacent to the outer skin and thus to the left and right of the longitudinal axis of the aircraft fuselage.

This embodiment has the following advantages. Firstly, a multi-part construction of the support device composed of support elements has the effect that multiple support elements can be installed simultaneously in the fuselage structure. In this way, it is possible for several technicians to work simultaneously, which greatly reduces the installation time for the installation of the support elements. Furthermore, even in the case of existing aircraft fuselages with the linear support device known from the prior art, individual elements can be easily and quickly exchanged. This is because it is possible for in each case only one support element to be exchanged for a support element according to the aircraft fuselage of the disclosure herein. Thus, in the case of existing aircraft, there is no need to exchange relatively large parts of the fuselage structure.

In an embodiment according to the first aspect of the disclosure herein, at least one first support element has a discrete energy absorption element which connects a lower section to an upper section, wherein the lower section has the lower end and the upper section has the upper end of the support device, and wherein, in the event of a relative movement of the lower section with respect to the upper section, the energy absorption element is plastically deformed.

A discrete energy absorption element is an energy absorption element which extends only in a spatially very limited region, for example the region of a joint, of a connecting or coupling point, between the upper and lower end of the support element. Thus, the absorption of the kinetic energy, and thus the plastic deformation, takes place in a locally concentrated manner in a discrete and particular region of the support element.

The lower section may preferably be formed as a rigid and/or straight lower section. Furthermore, the upper section may likewise be formed as a rigid and/or straight upper section. It is also conceivable for several or all of the support elements to be designed in the manner of the first support element, or to differ from the first support element in particular regions of the aircraft fuselage.

This embodiment has the advantage that it can be easy to construct and produce. Furthermore, the construction of such a first support element with a discrete energy absorption element can provide a larger utilizable space in relation to the linear support device in the prior art.

In an embodiment according to the first aspect of the disclosure herein, the energy absorption element has a spring element which, beyond the elastic range, is plastically deformable or which is combined with a damper element for the absorption of energy.

Here, the spring element may be designed in a variety of ways. For example, the spring element may have a spiral spring which, during the absorption of energy, is wound up beyond its elastic range and is thus plastically deformed. A winding-up action may, for example, be realized by virtue of a first end of the spiral spring being fastened to a lower section and a second end of the spiral spring being fastened to an upper section.

In a further form of a spring element, the spring element may also be a torsion spring. This, too, when used in the above-stated construction for absorbing energy, may be bent beyond its elastic range and thus plastically deformed.

It is also conceivable for the spring element to be a compression spring. In this case, similarly to the spiral spring, a first end of the compression spring may be connected to the lower section and a second end of the compression spring may be connected to the upper section of the support element. In this way, during actuation of the support element, the compression spring is pressed beyond its elastic range.

Furthermore, the energy absorption element may be coupled to at least one damper element for the absorption of energy. It is also conceivable for a spring element in the form of a spiral spring or of a compression spring to be coupled to at least one damper element. Damper elements may, for example, be fluid dampers.

Spring elements and damper elements have the advantage that they have a technically simple construction and thus require little maintenance. Furthermore, they are inexpensive and are known as reliable mechanical components. In this way, the costs for the construction of an aircraft fuselage are lowered, and the safety of the aircraft fuselage in the event of a crash is increased.

In an embodiment according to the first aspect of the disclosure herein, the lower section and the upper section are connected to one another in articulated fashion, wherein the spring element has a rotary spring at the joint, and/or wherein the spring element has a linear compression spring which is fastened, spaced apart from the joint, between the lower and upper sections.

An articulated connection may be any suitable joint connection which movably connects a lower section to an upper section in a joint region. Examples of typical joint types are universal joints, prismatic joints, rotary joints, screw joints, hinges, rotary prismatic joints and/or ball joints. Furthermore, the rotary spring may, for example, be a spiral spring.

Such a construction has the advantage that it is technically easy to realize and, in the event of damage, for example to the spring, can be serviced easily, that is to say with little effort.

In an embodiment according to the first aspect of the disclosure herein, the lower section and the upper section partially overlap, such that an upper end of the lower section is situated above a lower end of the upper section, and wherein the spring element comprises a linear tension spring which connects the upper end of the lower section and the lower end of the upper section and which, in the event of a relative movement of the lower and upper sections with respect to one another, is subjected to tensile load and in the process absorbs energy.

In this context, the expression an "upper end of the lower section above a lower end of the upper section" is to be understood to mean an "upper end of the lower section which is arranged further in the direction of the intermediate floor".

This embodiment, too, has the advantage that it provides a construction which is of simple design but which is reliable and inexpensive.

In an embodiment according to the first aspect of the disclosure herein, the energy absorption element has a torsion element which is attached between an upper end of the lower section and a lower end of the upper section of the support element and which, in the event of a relative rotational movement of the lower and upper sections with respect to one another, twists and in the process is plastically deformed.

A torsion element may, for example, be a torsion spring. It is however also conceivable for the torsion element to be any other twistable mechanical component. Furthermore, the plastic deformation of the torsion element takes place by absorption of kinetic energy from the crash or kinetic energy from the relative movement of the upper section and of the lower section with respect to one another.

This construction can also be easily realized in terms of design and therefore offers a reliable and robust construction.

In an embodiment according to the first aspect of the disclosure herein, at least one first support element has a continuous energy absorption element which is distributed continuously at least over a part of the length, preferably over the entire length, of the support element between the upper and lower ends of the support device.

A continuous energy absorption element is an energy absorption element which extends over a major section, or even completely, between the upper and lower ends of the support element. In this way, the absorption of the kinetic energy and thus the plastic deformation take place in a manner distributed globally and thus continuously over the region of the energy absorption element of the support element. In other words, the support element itself, or parts thereof, can be designed to be plastically deformable and adapted so as to absorb energy by plastic deformation.

A continuous energy absorption element may, for example, have a continuously curved form. Such a form may be designed to be uniform, that is to say with a uniform bend radius across the entire form. An example for such a form may be a uniform arc. It is however also conceivable for the bend radius to locally vary. For example, in the case of a locally varying bend radius, it is also possible for the sign of the bend radius to change. Such a construction with a locally varying bend radius may, for example, have a serpentine form as viewed in the profile of the energy absorption element. It is also conceivable for such a construction of an energy absorption element to have an S-shaped form as viewed in the profile. It is furthermore conceivable for the energy absorption element to have a construction which is inherently continuously or sectionally twisted. Finally, it is conceivable for the energy absorption element to have a combination of the above mentioned options. Other types of continuous construction are, however, also possible.

This embodiment likewise has the advantage that it is easy to construct and produce. Furthermore, the construction of a first support element with a continuous energy absorption element can provide a larger utilizable space in relation to the linear support device in the prior art.

In an embodiment according to the first aspect of the disclosure herein, at least one first support element has an externally supported energy absorption element which is fastened at a first end to the support element and which is connected at a second end to the intermediate floor or to the fuselage structure.

Such a construction of the at least one first support element may, for example, have a lower section and an upper section. Here, the lower section may be connected by a first end to the fuselage structure, and the upper section may be connected by a first end to the intermediate floor. Furthermore, the lower section, at a second end, and the upper section, at a second end, may be connected to one another in articulated fashion, for example, by a joint. The energy absorption element may be fastened by a first end to the joint or adjacent thereto. Furthermore, the energy absorption element may be connected at its second end to the intermediate floor or to the fuselage structure. The energy absorption element may be designed in a variety of ways. For example, it may be designed in one of the forms mentioned above.

This construction also has the advantage that it provides a construction which is simple in terms of design but which is reliable and inexpensive.

In an embodiment according to the first aspect of the disclosure herein, the energy absorption element has a linear spring element which, beyond the elastic range, is plastically deformable.

Springs have the advantage that they are components which are of simple design and which can be thus easy to produce. Furthermore, they exhibit high reliability, and can be exchanged as an individual component with little effort.

In an embodiment according to the first aspect of the disclosure herein, the spring element is either formed as a compression spring, which is connected at one end to the support element and at an opposite, other end to the intermediate floor, or is formed as a tension spring, which is connected at one end to the support element and at an opposite, other end to the fuselage structure.

Here, the connection by the other end of the support element to the fuselage structure is in particular a connection to the underside of the aircraft fuselage.

This construction also has the advantage that it provides a construction which is simple in terms of design but which is reliable and inexpensive.

In an embodiment according to the first aspect of the disclosure herein, the energy absorption element lies continuously against the surface of the support element and against the surface of the intermediate floor and/or of the fuselage structure such that, in the event of a relative movement of the support element with respect to the intermediate floor and/or to the fuselage structure, the energy absorption element is compressed between these and in the process is plastically deformed, absorbing energy.

In other words, the energy absorption element may be a continuous energy absorption element. This arises from the fact that the energy absorption element may extend over a major section or the entire section between the upper and lower ends of the support element. In this case, the intermediate floor can serve as counterbearing, with which the energy absorption element may be in permanent contact, that is to say contact by abutment of the energy absorption element against the intermediate floor. In the event of a crash of the underside of the aircraft fuselage, kinetic energy can be transmitted from the underside of the aircraft fuselage to the energy absorption element. Because of the permanent contact with the intermediate floor which serves as counterbearing, the energy absorption element can undergo compression, which can develop into a plastic deformation. Here, the kinetic energy transmitted from the underside of the aircraft fuselage can be converted into deformation energy.

It is, however, also conceivable for the energy absorption element to lie against the surfaces of the support element and of the fuselage structure, in particular of the fuselage structure at the underside of the aircraft fuselage. In this case, the fuselage structure can serve as counterbearing, with which the energy absorption element may be in permanent contact, that is to say contact by abutment of the energy absorption element against the fuselage structure. In the event of a crash of the underside of the aircraft fuselage, kinetic energy can be transmitted from the underside of the aircraft fuselage to the energy absorption element. Because of the permanent contact with the fuselage structure which serves as counterbearing, the energy absorption element can undergo compression, which can develop into a plastic deformation. Here, the kinetic energy transmitted from the underside of the aircraft fuselage can be converted into deformation energy.

This embodiment of a support element has the advantage that energy can be absorbed continuously. Furthermore, such a support element is easy to produce.

In an embodiment according to the first aspect of the disclosure herein, the energy absorption element is arcuate as viewed from a direction parallel to the longitudinal axis of the fuselage structure, wherein a concave side points in the direction of the longitudinal axis of the fuselage structure.

Such an energy absorption element is an example of a continuous energy absorption element. The energy absorption element can continuously convert kinetic energy into deformation energy by deformation of the arc. Furthermore, such a form, that is to say the concave, arcuate form as viewed from the direction of the longitudinal axis of the fuselage structure, can reduce the space required in the lower deck by the arrangement of the support element.

In an embodiment according to the first aspect of the disclosure herein, the energy absorption element has a first section with a driving-in section and has a second section with a receiving element, wherein the first section is movable relative to the driving-in section and wherein the receiving element is designed to receive the driving-in section when the driving-in section moves in the direction of the receiving element.

A driving-in section may, for example, be a bolt. A receiving element may, for example, be a bore which has a diameter smaller than the diameter of the bolt. The receiving element may however also be formed by a section of the support device or of a support element or a section of the intermediate floor or of the fuselage structure. The driving-in section may, for example, be arranged on an upper section of a support element, and the receiving element may be arranged on a lower section of the support element. The upper section of the support element may be movable relative to the lower section of the support element. In this way, the driving-in section, that is to say, for example, the bolt, can likewise be movable relative to the receiving element, that is to say, for example, to the bore, and in the direction thereof. It is however also conceivable for the energy absorption element to be designed as a so-called "crash element". A crash element has in this case a section which is plastically deformed as a result of a movement, that is to say a thrust movement, for example against a section of the intermediate floor, a section of the fuselage structure or a section of the support device or of the support element, and thus absorbs kinetic energy. In other words, a crash element can be "crashed", that is to say deformed, and thus can convert directional kinetic energy into non-directional or directional deformation energy, for example by compression.

In the event of a crash of the underside of a aircraft fuselage, it is now possible for the support element to transmit kinetic energy to the energy absorption element. The absorbed kinetic energy and the resulting relative movement between driving-in section and receiving element can now lead to the bolt of the driving-in section being driven into the bore of the receiving element. Here, the bore of the receiving element, because of its relatively small diameter, may shear material from the bolt, that is to say plastically deform the bolt.

Furthermore, it is also possible for the driving-in section to be arranged on the lower section and the receiving element to be arranged on the upper section of the support element. Finally, it is also conceivable for either the driving-in section or the receiving element to be arranged on the fuselage structure of the underside of the aircraft fuselage or on the intermediate floor, and for the corresponding counterpart, that is to say the receiving element or the driving-in section, to be arranged on the lower section of the support element or on the upper section of the support element respectively.

Such an arrangement also has the advantage that it provides a reliable and inexpensive energy absorption element.

In an embodiment according to the first aspect of the disclosure herein, the energy absorption element has a deformation element, wherein the deformation element is designed to undergo the plastic deformation by bending, rotation, compression or shearing when it absorbs kinetic energy.

Such a deformation element may be designed in a variety of ways, and is thus inexpensive to manufacture, and can be adapted to the position of the energy absorption element or of the support device in the aircraft fuselage.

In an embodiment according to the first aspect of the disclosure herein, the fuselage structure has an energy absorption region which is provided as a predetermined buckling line parallel to the longitudinal axis and which is designed to, in the event of a crash, undergo plastic deformation and absorb energy, wherein the predetermined buckling line is provided above the position at which the support device is fastened to the fuselage structure.

In other words, the fuselage structure may have a section which is designed for absorbing energy. Such a section may also be referred to as predetermined buckling line. The section may, for example, extend along a line running parallel to the longitudinal axis of the fuselage structure. However, other profiles of the section are also conceivable. It is also conceivable for such a section to be arranged on both sides of the fuselage structure in the lower deck, that is to say on a left-hand side and a right-hand side of the lower deck. This arrangement may, for example, be symmetrical with respect to a plane spanned by the longitudinal axis of the fuselage structure and of a line running perpendicular to the intermediate floor and through the longitudinal axis. Furthermore, the section for absorbing energy, that is to say the predetermined buckling line, may be arranged above the connection of the support device to the fuselage structure of the lower part of the aircraft fuselage, and thus further in the direction of the intermediate floor. It is also conceivable for more than one predetermined buckling line to be arranged on each side of the fuselage structure. Finally, it is conceivable for the predetermined buckling line to be of areal form with an extent in a circumferential direction and an extent in the direction of the longitudinal axis.

In the event of a crash of the underside of the aircraft fuselage, it is now possible for kinetic energy to also be absorbed by the predetermined buckling line in addition to the support device. Here, the predetermined buckling line can be plastically deformed such that the region adjacent to the predetermined buckling line at least partially moves outwards, that is to say away from the longitudinal axis of the fuselage structure. In other words, the predetermined buckling line "buckles" outwards. Here, the space between the fuselage structure and the support device increases. This enlarged space can now, for example, be occupied by the plastically deformable support device, without the support device colliding with the fuselage structure or with the outer skin arranged thereon.

This has the advantage that kinetic energy can also be absorbed by the fuselage structure in addition to the support device. Furthermore, the fuselage structure or the outer skin remains intact, because a collision is prevented because of the increase in size of the space between the plastically deformed support device and the fuselage structure or the outer skin arranged thereon.

The present object is furthermore achieved, by a second aspect of the disclosure herein, by a module for installation into an aircraft fuselage. The module for installation into an aircraft fuselage according to the second aspect of the disclosure herein comprises a support device and a wall panel which extends along a longitudinal axis and along a circumferential direction, wherein the support device has a lower end and an upper end, wherein the lower end is designed to be connected to a fuselage structure in a lower deck of the aircraft fuselage, and the upper end is designed to be connected to an intermediate floor in the aircraft fuselage, wherein the wall panel is connected to the support device, wherein the support device has a concave form as viewed from the longitudinal axis, wherein the support device has an energy absorption element between the upper end and the lower end, wherein the energy absorption element is designed such that, in the event of a defined crash of an underside of the aircraft fuselage, the energy absorption element undergoes a defined plastic deformation and, in so doing, absorbs a defined amount of kinetic energy of that part of the fuselage structure which is connected to the lower end of the support device, if the lower end of the support device is connected to the fuselage structure in the lower deck of the aircraft fuselage and if the upper end of the support device is connected to the intermediate floor in the aircraft fuselage, and wherein the defined plastic deformation and the defined amount of absorbed energy are selected such that, in the event of the crash, the fuselage structure is, at the underside of the aircraft fuselage, deformed at most to such an extent that a minimum height between a seat surface of passenger seats provided in the lower deck and the intermediate floor is not undershot.

In other words, the module according to the second aspect of the disclosure herein is provided for installation into an aircraft fuselage. A module may be a device which has a multiplicity of elements which together form the module. The module may furthermore be installed as a relatively small unit in a relatively large unit, for example an aircraft fuselage. In an installed, that is to say fitted state of the module in an aircraft fuselage, the module can interact with the aircraft fuselage. Corresponding fastening devices may be provided both on the module and in the aircraft fuselage. The fastening devices of the aircraft fuselage and of the module may be designed for installing the module, for example, in positionally fixed fashion in the aircraft fuselage.

The fuselage structure may have the form of a tube, though may also be a passenger region of a flying-wing aircraft. A flying-wing aircraft is an aircraft without a separately projecting elevator unit, vertical stabilizing fins or a rudder unit. The tubular fuselage structure may have, or be formed from, transverse and longitudinal stiffening elements. Both the transverse and the longitudinal stiffening elements increase the stability and stiffness of the fuselage structure. Transverse stiffening elements may be ribs which are arranged substantially in a circumferential direction of the tubular fuselage structure. Longitudinal stiffening elements may be so-called stringers, which are arranged substantially along an axis perpendicular to the circumferential direction, that is to say a central longitudinal axis (also referred to as central axis) of the fuselage structure. The fuselage structure may furthermore have an outer skin which spatially divides an interior compartment of the fuselage structure, that is to say a cabin interior compartment, from the external surroundings of the fuselage structure.

Furthermore, the aircraft fuselage has an intermediate floor, also referred to as cabin floor. This intermediate floor can extend horizontally through the interior compartment of the fuselage structure and can divide the interior compartment of the cabin, preferably at least in sections, into an upper deck and a lower deck. The upper deck is in this case preferably arranged above the lower deck. The intermediate floor can be furthermore fastened to the fuselage structure, that is to say, for example, to the longitudinal and/or transverse stiffening elements. The upper deck may in this case be designed as a cabin with seats for passengers. The lower deck may be configured as a freight compartment for transporting luggage belonging to the passengers and/or goods.

The module has a support device. The support device may have at least one first support element. The support device has an upper end and a lower end. The upper end of the support device is designed to be connected or fastened to the intermediate floor. The lower end of the support device is designed to be fastened to a section of the fuselage structure in the lower deck. Here, the upper end of the support device can be situated opposite the lower end of the support device. For example, the support device may be fastened to a transverse and/or longitudinal stiffening element when the module is installed in the aircraft fuselage. The lower end, fastened to the fuselage structure, of the support device can form in this case a counterbearing of the support device, whereby the support device can support the intermediate floor.

Furthermore, the module has a wall panel. In particular, the wall panel may be a wall lining element. The wall panel extends along a longitudinal axis and along a circumferential direction. Here, the longitudinal axis of the module may be the same longitudinal axis as the aircraft fuselage when the module is installed in the aircraft fuselage. It is however also conceivable for the longitudinal axis of the module to describe an axis of the module in the longitudinal axis of the module when the module is not installed in the aircraft fuselage, wherein the longitudinal axis of the module may however coincide with the longitudinal axis of the aircraft fuselage when the module is installed in the aircraft fuselage. The circumferential direction may be the circumferential direction of the aircraft fuselage when the module is installed in the aircraft fuselage. It is also conceivable for the circumferential direction to describe a direction of the module along a direction perpendicular to the longitudinal axis of the module, preferably a curved direction, when the module is not installed in the aircraft fuselage, wherein the circumferential direction of the module may coincide with the circumferential direction of the aircraft fuselage when the module is installed in the aircraft fuselage. Therefore, the wall panel may be designed as a plate-like element, wherein the plate-like element may have no or at least one curvature with a radius of curvature.

Furthermore, the wall panel is connected to the support device. A connection may be a direct connection or an indirect connection. A direct connection may be a connection in the case of which at least a part of a surface of the wall panel lies against a part of a surface of the support device. An indirect connection may be a connection in the case of which at least a part of a surface of the wall panel lies against a part of an intermediate element or of a set of intermediate elements. Then, in turn, a part of a surface of the support device may lie against at least one further part of the surface of the intermediate element or of the set of intermediate elements.

The support device may be designed in a variety of ways. For example, the support device may have one, two or a multiplicity of support elements. The support elements may, for example, be designed as struts and have an upper and a lower end. Here, a strut may describe an element which has a spatial extent or a size which corresponds to the spatial extent of a transverse and/or longitudinal stiffening element in an aircraft fuselage or a multiple thereof.

The support device has a form which is concave as viewed from the longitudinal axis, for example, from the longitudinal axis of the fuselage structure or the aircraft fuselage respectively. A concave form means that the support device preferably has a region between the lower and upper ends which runs not linearly but non-linearly. In particular, the support device may be kinked or curved away from the longitudinal axis of the aircraft fuselage.

Furthermore, the support device has an energy absorption element between the upper end and the lower end. The energy absorption element may, for example, be arranged in a defined local region between the upper end of the support device and the lower end of the support device. It is however also conceivable for the energy absorption element to extend from the upper end of the support device towards the lower end of the support device and thus globally over more than half or even the entire support device.

The energy absorption element is designed for absorbing kinetic energy, in particular energy from a defined crash of an underside of the aircraft fuselage, when the module is installed in the aircraft fuselage, that is to say the lower end of the support device is connected to the fuselage structure in the lower deck of the aircraft fuselage and when the upper end of the support device is connected to the intermediate floor in the aircraft fuselage. In this case, the energy absorption element is designed to undergo a defined plastic deformation and thus absorb a defined amount of kinetic energy of that part of the fuselage structure which is connected to the lower end of the support device.

The defined amount of energy absorbed by the energy absorption element and the defined plastic deformation are selected such that, in the event of the crash, the fuselage structure at the underside of the aircraft fuselage is deformed at most to such an extent that a minimum height between a seat surface of a passenger seat of passenger seats provided in the lower deck and the intermediate floor is not undershot. Thus, the energy absorption element absorbs such a defined amount of kinetic energy from the fuselage structure of the underside of the aircraft fuselage that the lower deck is not fully deformed and a "survival space" is present for the passengers in the lower deck during and after the crash. This survival space improves the survival chances of the passengers in the lower deck for the situation of a crash of the underside of the aircraft fuselage. Here, the lower deck is deformed at most such that the lower deck has a minimum height during and after the crash. Here, the minimum height describes the height or the vertical distance between a seat surface of a passenger seat arranged in the lower deck and the intermediate floor. This minimum height must not be undershot in the event of a crash. By the minimum height of the lower deck, a "survival space" for the passengers situated in the lower deck remains present in any case in the event of a crash, and thus improves the survival chances of the passengers.

The module according to the second aspect of the disclosure herein has the advantage that it can be easily installed into an aircraft fuselage. Furthermore, the modules can be manufactured already outside the aircraft fuselage, such that only the final installation has to be performed on-site in the aircraft fuselage, whereby the time required for the installation of the module is minimized. This leads to an increase in efficiency in the construction process of an aircraft fuselage or aircraft.

Furthermore, because of the space-saving design of the module, the spatial volume required for the support device in the lower deck is reduced. The special volume thus freed up can thus be additionally used for the arrangement of passenger seats.

Finally, the module, because of its capability of converting kinetic energy into plastic deformation energy, makes it possible in the first place for passengers to be transported safely or more safely in the lower deck, and greatly increases the likelihood of survival of the passengers transported in the lower deck.

In an embodiment according to the second aspect of the disclosure herein, the wall panel has a hinge region which is arranged adjacent to the energy absorption element of the structure element.

Here, a hinge region may be a region which connects an upper section of the wall panel to a lower section of the wall panel. The hinge region may have at least one hinge which is designed to movably connect the upper section of the wall panel to the lower section of the wall panel. The at least one hinge may be designed such that the mobility of the hinge is provided only after a minimum force has been overcome. Before the minimum force is overcome, the at least one hinge may be a rigid connection. Furthermore, the hinge region may be arranged in the region of the energy absorption element. It is finally conceivable for more than one hinge region to be provided. For example, two hinge regions may be oriented substantially parallel to one another and spaced apart in the circumferential direction.

The hinge region has the advantage that, in the event of a crash of the underside of the aircraft fuselage and the absorption of energy by the energy absorption element by plastic deformation, the wall panel can follow the movement of the support device in the direction of the fuselage structure. This prevents the wall panel from being uncontrollably damaged, and passengers being injured by flying parts of the wall panels, during the plastic deformation of the support device or of the energy absorption element.

In an embodiment according to the second aspect of the disclosure herein, the wall panel and/or the support device has connecting elements which are designed to be connected to connecting elements of a further module.

Here, the further module may be a module according to the second aspect of the disclosure herein. It is however also conceivable for the further module to be a module of some other construction. For example, the further module may be a module which merely has a wall panel and fastener(s) for fastening to the fuselage structure and/or the intermediate floor. In particular, the further module may be a module which has no support device. In this context, connecting elements may be all elements suitable for connecting modules. Examples of such connecting elements are screws and bores, clamping connectors and/or plug connectors.

Such an embodiment offers an increased degree of flexibility in the installation of modules in an aircraft.

In an embodiment according to the second aspect of the disclosure herein, the module has a display element which is designed for displaying exterior views of the aircraft.

The display element may, for example, be arranged over a full area over the entire wall panel, or only over an upper section of the wall panel, or only in certain regions, for example in the form of a typical window pattern of an aircraft cabin. The contents displayed on the display element may, for example, be moving images, live images from one or more exterior cameras, or static images.

Through the use of display elements in the module, the comfort of the passenger in the lower deck as a passenger deck is improved.

In an embodiment according to the second aspect of the disclosure herein, an outer surface, directed in the direction of the longitudinal axis, of the support device and/or of the wall panel has an S shape as viewed from a direction parallel to the longitudinal axis of the fuselage structure.

In one section of the wall panel formed by the S shape, it is, for example, possible to create a stowage compartment in which the passenger can stow items of luggage. It is furthermore conceivable that, by the S shape, a section is created which, through suitable dimensioning and material selection, can likewise absorb energy in the event of a crash. Such a section can then act as an additional energy absorption element. Finally, a combination of stowage compartment and additional energy absorption element is also conceivable.

The S shape thus increases the comfort of the passengers and/or can contribute to the improvement in safety and the chances of survival of the passengers.

In an embodiment according to the second aspect of the disclosure herein, the wall panel is divided by the hinge region into an upper section of the wall panel and a lower section of the wall panel, wherein the upper section of the wall panel is displaceable, behind or in front of the lower section of the wall panel, in the direction of the lower section of the wall panel.

In other words, the upper section of the wall panel can, for example, move in a circumferential direction relative to the lower section of the wall panel and in the direction of the lower section of the wall panel. It is also conceivable for the lower section of the wall panel to be capable of moving in the circumferential direction relative to the upper section of the wall panel and in the direction of the upper section of the wall panel. For this purpose, the moving section of the wall panel may have a fastening device by which the moving section is connected to the support structure. At the same time, the fastening device may permit a movement in the circumferential direction which may preferably be decoupled from a movement of the support element in the event of a crash. It is however also possible for the upper or lower section, in the event of a movement of the support element of the module, to move jointly with the support element and thus, for example, move away or buckle away from the longitudinal axis.

The relative movement capability of the wall panel has the advantage that, in the event of a crash of the underside of the aircraft fuselage and the absorption of energy by the energy absorption element by plastic deformation, the wall panel can, for example, because of the movement of the support device coupled thereto, follow the latter in the direction of the fuselage structure. This prevents the wall panel from being uncontrollably damaged during the plastic deformation of the support device and/or of the energy absorption element and passengers being injured by flying parts of the wall panels.

In an embodiment according to the second aspect of the disclosure herein, the wall panel has a section which provides at least one receptacle and/or fastening for cables, lines and/or pipes.

Such a section is preferably arranged on a rear side of the wall panel. A rear side of the wall panel may in this case be a surface of the wall panel averted from the longitudinal axis. Typical sections for receiving and/or fastening for cables and lines may be: cable channels, clamps, brackets, clips, empty pipes in which cables can be laid, or a rail system with modular holders. Typical sections for receiving and/or fastening for pipes may be: pipe clips, channels, pipe carriages, round hoops, pipe brackets or a rail system with modular holders.

The provision of at least one such section has the advantage that cables, lines and/or pipes can be laid with little effort during the installation of the module. This in turn saves time and improves efficiency.

In an embodiment according to the second aspect of the disclosure herein, the wall panel has a section which provides a stowage compartment.

A stowage compartment is a space for accommodating articles such as, for example, items of luggage or flotation vests.

The provision of a stowage compartment in a section of the wall panel has the advantage that a passenger sitting adjacent to the wall panel or to the module can place their items of luggage in the stowage compartment and thus has an increased amount of legroom, for example, at their seat.

In an embodiment according to the second aspect of the disclosure herein, the stowage compartment is arranged in the lower section of the wall panel.

For example, the stowage compartment may be arranged in a region offset with respect to the lower section of the wall panel, for example in the form of a type of box. It is however also conceivable for the stowage compartment to be recessed into the lower section of the wall panel such that the wall panel with stowage compartment visually differs from a wall panel without stowage compartment on an inner side of the wall panel only by an opening for accessing the stowage compartment. An inner side of the wall panel may in this case be that side of the wall panel which faces towards the longitudinal axis.

Through the provision of the stowage compartment in the lower section of the wall panel, the upper section of the wall panel can be utilized separately, for example by providing a display element.

In an embodiment according to the second aspect of the disclosure herein, the wall panel has side surfaces transverse to the longitudinal axis, and is connected to the support device in at least one section of one of the side surfaces.

Side surfaces may preferably be surfaces which are connected in one region to the inner side of the wall panel and in another region to the rear side of the wall panel, and which point away from the wall panel.

Such a connection of the wall panel to the support device has the advantage that it can be technically easily produced and can thus be performed quickly during the assembly of the module. This increases the efficiency during the assembly of the module.

In an embodiment according to the second aspect of the disclosure herein, the support device has at least one support element, wherein the support element has an energy absorption element, wherein the support element and/or the energy absorption element is arcuate as viewed from a direction parallel to the longitudinal axis of the fuselage structure, wherein a concave side points in the direction of the longitudinal axis of the fuselage structure.

Such an energy absorption element is an example of a continuous energy absorption element. A continuous energy absorption element is an energy absorption element which extends over a major section, or even completely, between an upper and a lower end of the support element. In this way, the absorption of the kinetic energy and thus the plastic deformation take place in a manner distributed globally and thus continuously over the region of the energy absorption element of the support element. In other words, the support element itself, or parts thereof, can be designed to be plastically deformable and adapted so as to absorb energy by plastic deformation.

The energy absorption element can convert kinetic energy into deformation energy in continuous fashion by deformation of the arc. Furthermore, such a form, that is to say the concave, arcuate form as viewed from the direction of the longitudinal axis of the fuselage structure, can reduce a space required by the arrangement of the module in the lower deck.

In an embodiment according to the second aspect of the disclosure herein, the module has a support device with at least one first support element, wherein the first support element has a discrete energy absorption element which connects a lower section to an upper section, wherein the lower section has the lower end and the upper section has the upper end of the support device, and wherein, in the event of a relative movement of the lower section with respect to the upper section, the energy absorption element is plastically deformed.

A discrete energy absorption element is an energy absorption element which extends only in a spatially very limited region, for example the region of a joint, of a connecting or coupling point, between the upper and lower end of the support element. Thus, the absorption of the kinetic energy, and thus the plastic deformation, takes place in a locally concentrated manner in a discrete and particular region of the support element.

The lower section may preferably be formed as a rigid and/or straight lower section. Furthermore, the upper section may likewise be formed as a rigid and/or straight upper section. It is also conceivable for several or all of the support elements to be designed in the manner of the first support element, or to differ from the first support element in particular regions of the aircraft fuselage.

This embodiment has the advantage that it is easy to construct and produce.

In an embodiment according to the second aspect of the disclosure herein, the support device or the energy absorption element has a spring element which, beyond the elastic range, is plastically deformable or which is combined with a damper element for the absorption of energy.

Here, the spring element may be designed in a variety of ways. For example, the spring element may have a spiral spring which, during the absorption of energy, is wound up beyond its elastic range and is thus plastically deformed. A winding-up action may, for example, be realized by virtue of a first end of the spiral spring being fastened to a lower section and a second end of the spiral spring being fastened to an upper section.

In a further form of a spring element, the spring element may also be a torsion spring. This, too, when used in the above-stated construction for absorbing energy, may be bent beyond its elastic range and thus plastically deformed.

It is also conceivable for the spring element to be a compression spring. In this case, similarly to the spiral spring, a first end of the compression spring may be connected to the lower section and a second end of the compression spring may be connected to the upper section of the support element. In this way, during actuation of the support element, the compression spring is pressed beyond its elastic range.

Furthermore, the energy absorption element may be coupled to at least one damper element for the absorption of energy. It is also conceivable for a spring element in the form of a spiral spring or a compression spring to be coupled to at least one damper element. Damper elements may, for example, be fluid dampers.

Spring elements and damper elements have the advantage that they have a technically simple construction and thus require little maintenance. Furthermore, they are inexpensive and are known as reliable mechanical components. In this way, the costs for the construction of a module are lowered, and the safety of the aircraft fuselage in the event of a crash, when the module is installed, is increased.

In an embodiment according to the second aspect of the disclosure herein, the energy absorption element lies continuously against the surface of the support element and against the surface of the intermediate floor and/or the fuselage structure, when the module is installed in the aircraft fuselage, such that, in the event of a relative movement of the support element with respect to the intermediate floor and/or the fuselage structure, the energy absorption element is compressed between these and in the process is plastically deformed, absorbing energy.

In other words, the energy absorption element may be a continuous energy absorption element. This arises from the fact that the energy absorption element may extend over a major section or the entire section between the upper and lower ends of the support element. When the module is installed, the intermediate floor can serve as counterbearing, with which the energy absorption element may be in permanent contact, that is to say contact by abutment of the energy absorption element against the intermediate floor. In the event of a crash of the underside of the aircraft fuselage, kinetic energy can, when the module is installed, be transmitted from the underside of the aircraft fuselage to the energy absorption element. Because of the permanent contact with the intermediate floor which serves as counterbearing, the energy absorption element can undergo compression, which can develop into a plastic deformation. Here, the kinetic energy transmitted from the underside of the aircraft fuselage can be converted into deformation energy.

It is however also conceivable for the energy absorption element to lie against the surfaces of the support element and of the fuselage structure, in particular of the fuselage structure at the underside of the aircraft fuselage, when the module is installed. In this case, the fuselage structure can serve as counterbearing, with which the energy absorption element may be in permanent contact, that is to say contact by abutment of the energy absorption element against the fuselage structure. In the event of a crash of the underside of the aircraft fuselage, kinetic energy can, when the module is installed, be transmitted from the underside of the aircraft fuselage to the energy absorption element. Because of the permanent contact with the fuselage structure which serves as counterbearing, the energy absorption element can undergo compression, which can develop into a plastic deformation. Here, the kinetic energy transmitted from the underside of the aircraft fuselage can be converted into deformation energy.

It is furthermore conceivable that, for the situation that the module is installed in the aircraft fuselage, and the energy absorption element lies with one of its surfaces against a surface of the fuselage structure, the energy absorption element can be designed as part of the wall panel. In particular, in this case, the energy absorption element may be designed as a stowage compartment or a container. This container may, through corresponding dimensioning and construction, be designed to absorb kinetic energy from the underside of the aircraft fuselage, and undergo plastic deformation, in the event of a crash of the underside of the aircraft fuselage.

This embodiment of a module with a support element of the type has the advantage that energy can be absorbed continuously. Furthermore, a module of the type with a support element of such design is easy to produce.

Furthermore, the present object is achieved by an aircraft having an aircraft fuselage according to the first aspect of the disclosure herein and/or having a module according to the second aspect of the disclosure herein.

An aircraft of the type has the advantage that passengers can be transported in the lower deck. Furthermore, by the aircraft fuselage provided in the aircraft and/or at least one module, the likelihood of survival of passengers in the lower deck in the event of a crash of the underside of the aircraft fuselage can be considerably improved.

In an embodiment of the aircraft having an aircraft fuselage with a fuselage structure and with a module, according to the second aspect of the disclosure herein, the fuselage structure has an energy absorption region which is provided as a predetermined buckling line parallel to the longitudinal axis and which is designed to, in the event of a crash, undergo plastic deformation and absorb energy, wherein the predetermined buckling line is provided above the position at which the support device is fastened to the fuselage structure.

In other words, the fuselage structure may have a section which is designed for absorbing energy. Such a section may also be referred to as predetermined buckling line. The section may, for example, extend along a line running parallel to the longitudinal axis of the fuselage structure. However, other profiles of the section are also conceivable. It is also conceivable for such a section to be arranged on both sides of the fuselage structure in the lower deck, that is to say on a left-hand side and a right-hand side of the lower deck. This arrangement may, for example, be symmetrical with respect to a plane spanned by the longitudinal axis of the fuselage structure and of a line running perpendicular to the intermediate floor and through the longitudinal axis. Furthermore, the section for absorbing energy, that is to say the predetermined buckling line, may be arranged above the connection of the support device of the module to the fuselage structure of the lower part of the aircraft fuselage, and thus further in the direction of the intermediate floor. It is also conceivable for more than one predetermined buckling line to be arranged on each side of the fuselage structure. Finally, it is conceivable for the predetermined buckling line to be of areal form with an extent in a circumferential direction and an extent in the direction of the longitudinal axis.

In the event of a crash of the underside of the aircraft fuselage, it is now possible for kinetic energy to also be absorbed by the predetermined buckling line in addition to the module or the support device thereof. Here, the predetermined buckling line can plastically deform such that the region adjacent to the predetermined buckling line at least partially moves outwards, that is to say away from the longitudinal axis of the fuselage structure. In other words, the predetermined buckling line "buckles" outwards. Here, the space between the fuselage structure and the support device of the module increases. This enlarged space can now, for example, be occupied by the plastically deformable support device of the module, without the support device colliding with the fuselage structure or with the outer skin arranged thereon.

This has the advantage that kinetic energy can also be absorbed by the fuselage structure in addition to the module or the support device thereof. Furthermore, the fuselage structure or the outer skin remains intact, because a collision is prevented because of the increase in size of the space between the plastically deformed support device and the fuselage structure or the outer skin arranged thereon.

BRIEF DESCRIPTION OF THE DRAWINGS

The disclosure herein will be described below on the basis of schematic drawings, which are merely exemplary, and in which.

DETAILED DESCRIPTION

Figure 1:
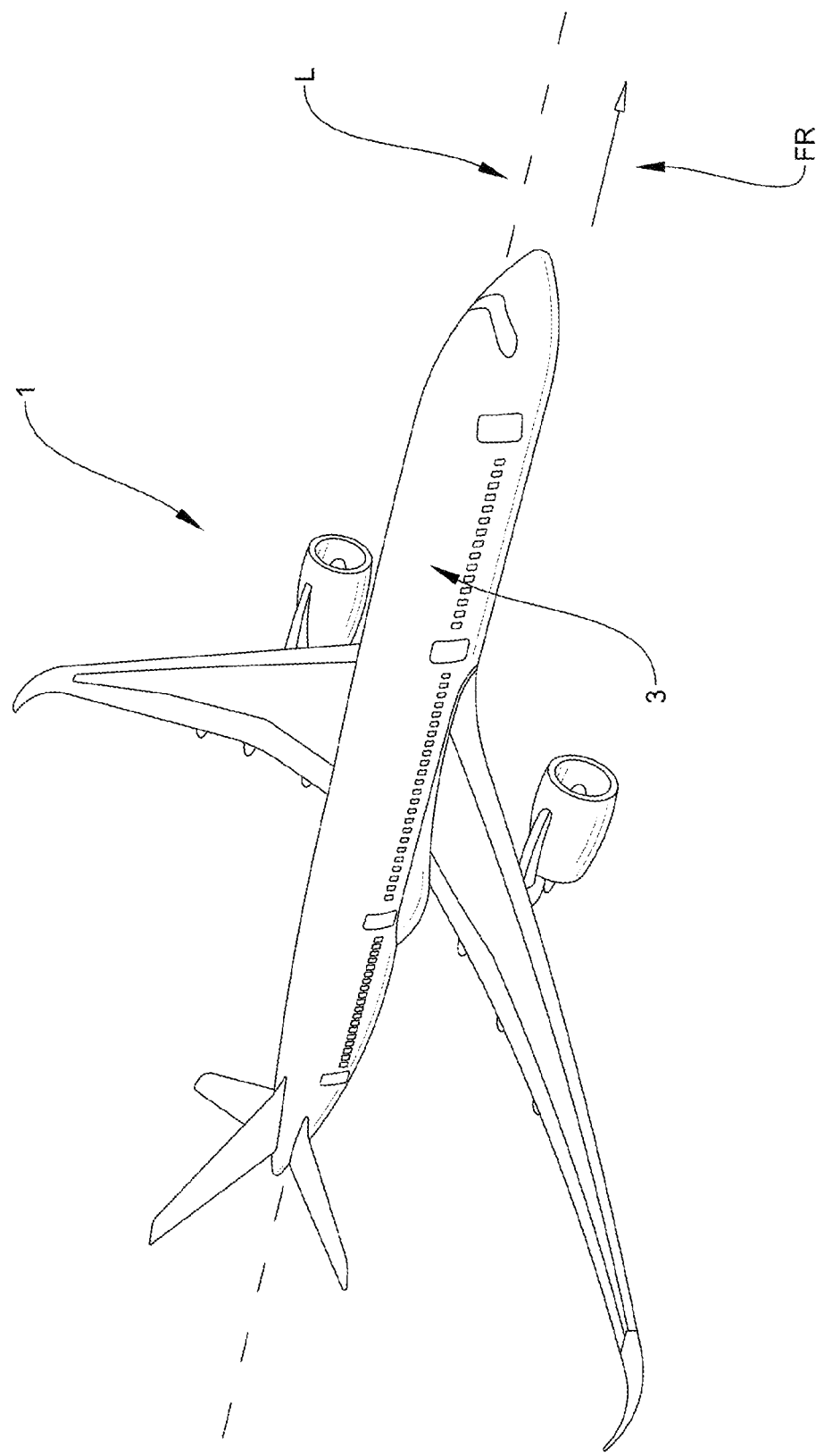
FIG. 1 shows an embodiment of an aircraft having an aircraft fuselage and/or module according to the disclosure herein.

FIG. 1 shows an aircraft 1 having an aircraft fuselage 3 according to the first aspect of the disclosure herein and a module according to the second aspect of the disclosure herein. The aircraft 1 or the aircraft fuselage 3 has a longitudinal axis L. The longitudinal axis L is parallel to a direction of flight F of the aircraft 1 during straight-ahead flight.

Figure 2:
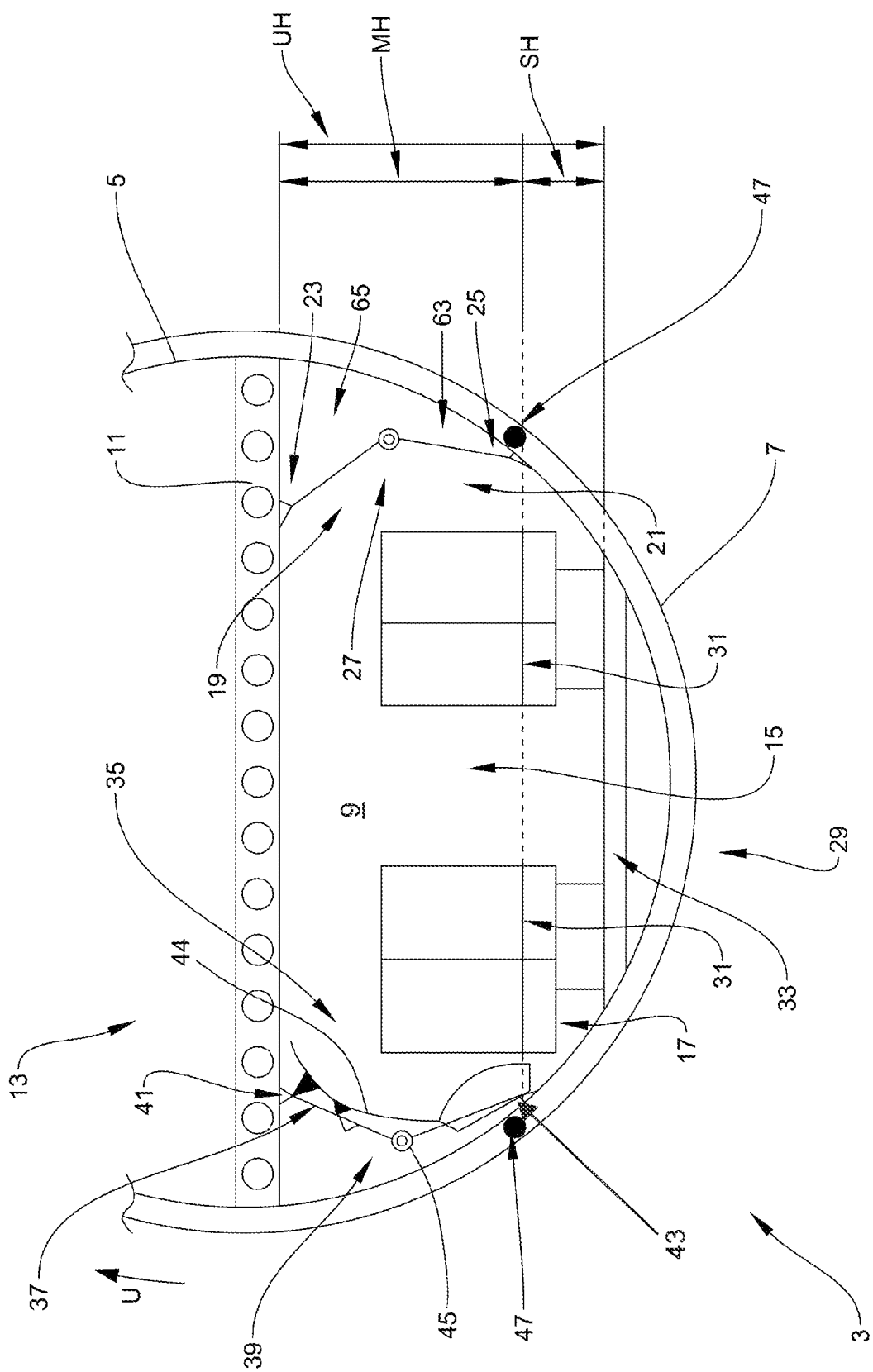
FIG. 2 shows a part of a cross section through the aircraft fuselage in FIG. 1.

FIG. 2 shows a cross section of a part of the aircraft fuselage 3 from FIG. 1. Here, the aircraft fuselage 3 has a fuselage structure 5. Here, the fuselage structure 5 has the form of a tube, though may also be a passenger region of a flying-wing aircraft. A flying-wing aircraft is an aircraft without a separately projecting elevator unit, vertical stabilizing fins or a rudder unit. The tubular fuselage structure 5 may have, or be formed from, transverse and longitudinal stiffening elements. Both the transverse and the longitudinal stiffening elements increase the stability and stiffness of the fuselage structure 5. Transverse stiffening elements may be ribs which are arranged substantially in a circumferential direction U of the tubular fuselage structure 5. Longitudinal stiffening elements may be so-called stringers, which are arranged substantially along an axis perpendicular to the circumferential direction U, that is to say the central longitudinal axis L of the fuselage structure 5. The fuselage structure 5 may furthermore have an outer skin 7 which spatially divides an interior compartment 9 of the fuselage structure 5, that is to say a cabin interior compartment, from the external surroundings of the fuselage structure 5.

Furthermore, the aircraft fuselage 3 has an intermediate floor 11, also referred to as cabin floor. This intermediate floor extends horizontally through the interior compartment 9 of the fuselage structure 5 and divides the interior compartment 9 of the cabin, preferably at least in sections, into an upper deck 13 and a lower deck 15. The upper deck 13 is in this case preferably arranged above the lower deck 15. The intermediate floor 11 is furthermore fastened to the fuselage structure 5, that is to say, for example, to the longitudinal and/or transverse stiffening elements. The upper deck 13 may in this case be designed as a cabin with passenger seats 17 with seats for passengers. The lower deck 15 may be configured as a freight compartment for transporting luggage belonging to the passengers and/or goods.

Furthermore, a support device 19 is provided in the lower deck 15. The support device 19 may have at least one first support element 21. The support device 19 has an upper end 23 and a lower end 25. The upper end 23 of the support device 19 is fastened to the intermediate floor 11. The lower end 25 of the support device 19 is fastened to a section of the fuselage structure 5 in the lower deck 15. Here, the upper end 23 of the support device 19 is situated opposite the lower end 25 of the support device 19. For example, the support device 19 may be fastened to a transverse and/or longitudinal stiffening element. The lower end 25, fastened to the fuselage structure 5, of the support device 19 forms a counterbearing of the support device 19, whereby the support device 19 can support the intermediate floor.

The support device 19 may be designed in a variety of ways. For example, the support device 19 may have one, two or a multiplicity of support elements 21. The support elements 21 may, for example, be designed as struts and have an upper and a lower end. Here, a strut may describe an element which has a spatial extent or a size which corresponds to the spatial extent of a transverse and/or longitudinal stiffening element or a multiple thereof. The upper ends of the support elements 21 may each be fastened to the intermediate floor 11. The lower ends of the support elements 21 may each be fastened to a section of the fuselage structure 5 in the lower deck 15. For example, the support elements 21 may each be fastened to one or more transverse and/or longitudinal stiffening elements. The support elements may be arranged in the two end regions of the lower deck 15, that is to say in the region of the lower deck 15 adjacent to the outer skin 7.

It is however also conceivable for the support device 19 to have one, two or a multiplicity of panel-like support elements 21, that is to say support elements 21 in the form of panels. A panel-like support element 21 may be a support element 21 which has both an extent in the circumferential direction U and an extent in the longitudinal axis L of the fuselage structure 5. For example, a panel-like support element 21 may have an extent in a longitudinal axis L of the aircraft fuselage 3 which lies in the range of the spacing of the transverse stiffening elements or one or more multiples thereof. Furthermore, the panel-like support element 21 may have an extent in a circumferential direction U of the aircraft fuselage 3 which lies in the range of the spacing of longitudinal stiffening elements or one or more multiples thereof. Finally, it is conceivable for a multiplicity of panel-like support elements 21 to be arranged in the lower deck 15 and to support the intermediate floor 11. The panel-like support elements 21 may each also have an upper and a lower end. Here, the upper ends of the support elements 21 may each be fastened to the intermediate floor 11. The lower ends of the support elements 21 may each be fastened to a section of the fuselage structure 5 in the lower deck 15. For example, the support elements 21 may each be fastened to one or more transverse and/or longitudinal stiffening elements. The support elements 21 may be arranged in the two end regions of the lower deck 15, that is to say in the region of the lower deck 15 adjacent to the outer skin 7.

The support device 19 has a form which is concave as viewed from the longitudinal axis L of the fuselage structure 5. A concave form means that the support device 19 preferably has a region between the lower and upper ends 23, 25 which runs not linearly but non-linearly. In particular, the support device 19 may be kinked or curved towards the fuselage structure 5 and thus kinked or curved away from the longitudinal axis L of the aircraft fuselage 3.

Furthermore, the support device 19 has an energy absorption element 27 between the upper end 23 and the lower end 25. The energy absorption element 27 may, for example, be arranged in a defined local region between the upper end 23 of the support device 19 and the lower end 25 of the support device 19. It is however also conceivable for the energy absorption element 27 to extend from the upper end 23 towards the lower end 25 and thus globally over more than half or even the entire support device 19. The energy absorption element 27 is designed for absorbing kinetic energy, in particular energy from a crash.

The energy absorption element 27 is furthermore designed such that, in the event of a defined crash of an underside 29 of the aircraft fuselage 3, the energy absorption element 27 absorbs a defined amount of kinetic energy. The kinetic energy originates from that part of the fuselage structure 5 which is connected to the lower end 25 of the support device 19. In absorbing kinetic energy from a crash, the energy absorption element 27 undergoes a defined plastic deformation. Here, a plastic deformation describes a conversion of the kinetic energy from the crash into some other form of energy, such as, for example, deformation energy or heat.

Furthermore, FIG. 2 shows, in the cross section of the aircraft fuselage 3, a module 35. The module 35 is provided for installation into the aircraft fuselage 3 and is shown in FIG. 2 in an installed, that is to say fitted state.

The module 35 has a support device 37. The support device 37 may have at least one first support element 39. The support device 37 has an upper end 41 and a lower end 43. The upper end 41 of the support device 37 is designed to be connected or fastened to the intermediate floor 11. The lower end 43 of the support device 37 is designed to be fastened to a section of the fuselage structure 5 in the lower deck 15. Here, the upper end 41 of the support device 37 may be situated opposite the lower end 43 of the support device 37. For example, the support device 37 may be fastened to a transverse and/or longitudinal stiffening element when the module 35 is installed in the aircraft fuselage 3. The lower end 43, fastened to the fuselage structure 5, of the support device 37 may form a counterbearing of the support device 37, whereby the support device 37 can support the intermediate floor 11.

Furthermore, the module 35 has a wall panel 44. In particular, the wall panel 44 may be a wall lining element. The wall panel 44 extends along a longitudinal axis L and along a circumferential direction U. Here, the longitudinal axis L of the module 35 may be the same longitudinal axis L of the aircraft fuselage 3 when the module 35 is installed in the aircraft fuselage 3. It is, however, also conceivable for the longitudinal axis L of the module to describe an axis of the module 35 in the longitudinal axis of the module 35 when the module 35 is not installed in the aircraft fuselage 3, wherein the longitudinal axis L of the module 35 may however coincide with the longitudinal axis L of the aircraft fuselage 3 when the module 35 is installed in the aircraft fuselage 3. The circumferential direction U may be the circumferential direction U of the aircraft fuselage 3 when the module 35 is installed in the aircraft fuselage 3. It is also conceivable for the circumferential direction U to describe a direction of the module 35 along a direction perpendicular to the longitudinal axis L of the module 35, preferably a curved direction, when the module 35 is not installed in the aircraft fuselage 3, wherein the circumferential direction U of the module 35 may coincide with the circumferential direction U of the aircraft fuselage 3 when the module 35 is installed in the aircraft fuselage 3. Therefore, the wall panel 44 may be designed as a plate-like element, wherein the plate-like element may have no or at least one curvature with a radius of curvature.

Furthermore, the wall panel 44 is connected to the support device 37. A connection may be a direct connection or an indirect connection. A direct connection may be a connection in the case of which at least a part of a surface of the wall panel 44 lies against a part of a surface of the support device 37. An indirect connection may be a connection in the case of which at least a part of a surface of the wall panel 44 lies against a part of an intermediate element or of a set of intermediate elements. Then, in turn, a part of a surface of the support device 37 may lie against at least one further part of the surface of the intermediate element or of the set of intermediate elements.

The support device 37 may be designed in a variety of ways. For example, the support device 37 may have one, two or a multiplicity of support elements 39. The support elements 39 may, for example, be designed as struts and have an upper and a lower end. Here, a strut may describe an element which has a spatial extent or a size which corresponds to the spatial extent of a transverse and/or longitudinal stiffening element in an aircraft fuselage 3 or a multiple thereof.

The support device 37 has a form which is concave as viewed from the longitudinal axis L, for example the longitudinal axis L of the fuselage structure or of the aircraft fuselage 3. A concave form means that the support device 37 preferably has a region between the lower and upper ends 43, 41 which runs not linearly but non-linearly. In particular, the support device 37 may be kinked or curved away from the longitudinal axis L of the aircraft fuselage 3.

Furthermore, the support device 37 has an energy absorption element between the upper end 41 and the lower end 43. The energy absorption element 45 may, for example, be arranged in a defined local region between the upper end 41 of the support device 37 and the lower end 43 of the support device 37. It is however also conceivable for the energy absorption element 45 to extend from the upper end 41 of the support device 37 towards the lower end 43 of the support device 37 and thus globally over more than half or even the entire support device 37.

The energy absorption element 45 is, like the energy absorption element 27 of the support device, designed for absorbing kinetic energy, in particular energy from the defined crash of the underside 29 of the aircraft fuselage 3, when the module 35 is installed in the aircraft fuselage 3 as shown in FIG. 2, that is to say the lower end 43 of the support device 37 of the module 35 is connected to the fuselage structure 5 in the lower deck 15 of the aircraft fuselage 3 and when the upper end 43 of the support device 37 is connected to the intermediate floor 11 in the aircraft fuselage 3. In this case, the energy absorption element 45 is designed to undergo a defined plastic deformation and thus absorb a defined amount of kinetic energy of that part of the fuselage structure 5 which is connected to the lower end 43 of the support device 37. Here, a plastic deformation describes a conversion of the kinetic energy from the crash into some other form of energy, such as, for example, deformation energy or heat.

Both in the case of the support device 19 of the aircraft fuselage 3 and in the case of the support device 37 of the module 35, the defined amount of energy absorbed by the energy absorption element 27 or 45 respectively is selected to be equal.

The defined amount of energy absorbed by the energy absorption element 27 of the support device 19 of the aircraft fuselage 3 is selected such that, in the event of the crash of the fuselage structure 5 at the underside 29 of the aircraft fuselage 3, the lower deck 15 is not fully deformed. The lower deck is deformed at most such that the lower deck 15 has a minimum height MH during and after the crash. Here, the minimum height MH describes the height or the vertical distance between a seat surface of a passenger seat arranged in the lower deck and the intermediate floor. In other words, the minimum height MH is the height UH of the lower deck 15 minus the height SH of the seat surface 31 above the floor 33 of the lower deck 15. This minimum height MH must not be undershot in the event of a crash. By the minimum height MH of the lower deck 15, a "survival space" for the passengers situated in the lower deck remains present in any case in the event of a crash, and thus improves the survival chances of the passengers.

The same applies to the energy absorption element 45 of the module 35. The defined amount of energy absorbed by the energy absorption element 45 and the defined plastic deformation are selected such that, in the event of the crash, the fuselage structure 5 at the underside 29 of the aircraft fuselage 3 is deformed at most to such an extent that a minimum height MH between a seat surface 31 of a passenger seat of passenger seats 17 provided in the lower deck 15 and the intermediate floor 11 is not undershot. Thus, the energy absorption element 45 absorbs such a defined amount of kinetic energy from the fuselage structure 5 of the underside 29 of the aircraft fuselage 3 that the lower deck 15 is not fully deformed and a "survival space" is present for the passengers in the lower deck 15 during and after the crash. This survival space improves the survival chances of the passengers in the lower deck 15 for the situation of a crash of the underside 29 of the aircraft fuselage 3. Here, the lower deck 15 is deformed at most such that the lower deck 15 has a minimum height MH during and after the crash. Here, the minimum height MH describes the height or the vertical distance between a seat surface 31 of a passenger seat 17 arranged in the lower deck 15 and the intermediate floor 11. In other words, the minimum height MH, exactly as in the case of the support device 19 of the aircraft fuselage 3, describes the height UH of the lower deck 15 minus the height SH of the seat surface 31 above the floor 33 of the lower deck 15. In the present case, the minimum height MH is 1.80 meters, and must not be undershot in the event of a crash. By the minimum height MH of the lower deck 15, a "survival space" for the passengers situated in the lower deck 15 remains present in any case in the event of a crash, and thus improves the survival chances of the passengers.

Furthermore, a predetermined buckling line 47 is provided in the fuselage structure 5. The predetermined buckling line 47 provides an energy absorption region which is provided in linear form parallel to the longitudinal axis L. The predetermined buckling line 47 is furthermore designed to, in the event of a crash of the underside 29 of the aircraft fuselage 3, undergo a plastic deformation and absorb energy. For this purpose, the predetermined buckling line 47 is provided above (that is to say further in the direction of the intermediate floor 11) the position at which the support device 19 of the aircraft fuselage 3 and/or the support device 37 of the module 35 is fastened to the fuselage structure 5.

The support device 19, 37 of the aircraft fuselage 3 or of the module 35 that is installed in the aircraft fuselage have the advantage, as shown in FIG. 2, that the space requirement of the support device 19 or of the module 35 is considerably reduced, because of the substantially concave form of the support device 19 or of the module 35 in the lower deck 15, in relation to a linearly configured support structure with the same installation points on the intermediate floor 11 and on the fuselage structure 5. The space in the lower deck 15 that is not required because of the concave form of the support device 19 of the aircraft fuselage 3 and of the module 35 can thus also be used for the seating of passengers. Furthermore, both the energy absorption element 27 of the support device 19 of the aircraft fuselage 3 and the energy absorption element 45 of the module 35 ensure survival of the passengers in the event of a crash.

Figure 3A:
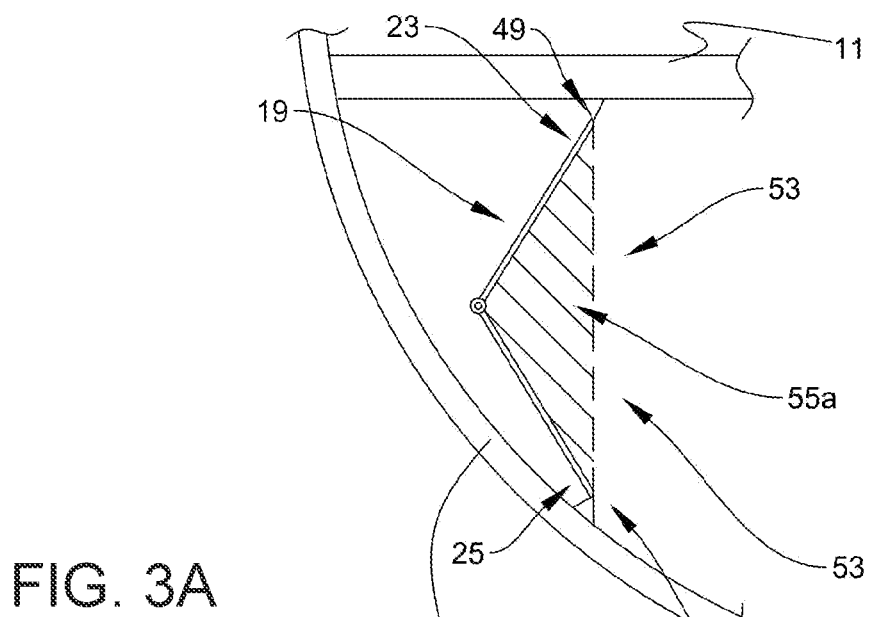
FIGS. 3A and 3B schematically show the support device in the prior art and the support device of the aircraft fuselage and/or module according to the disclosure herein.
Figure 3B:
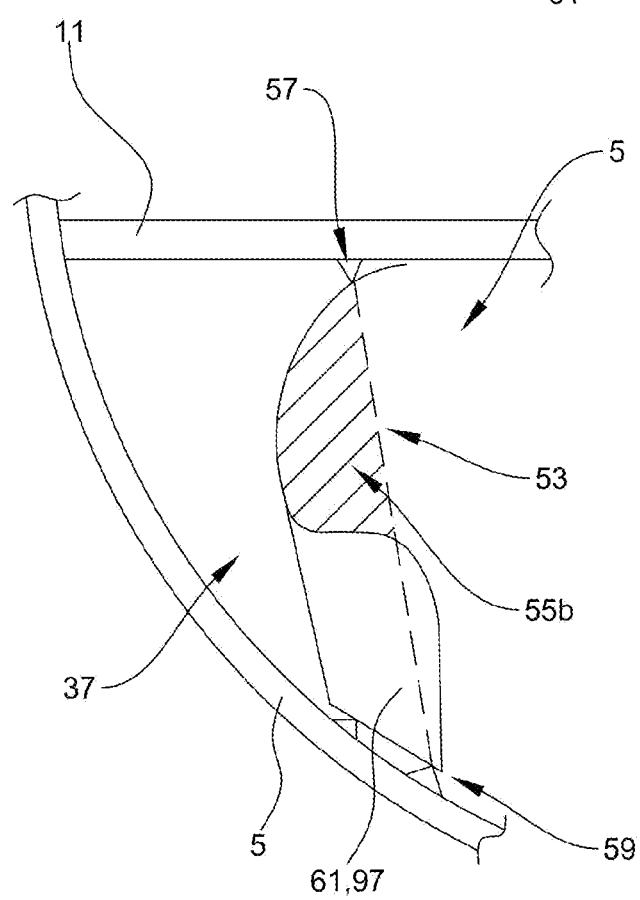

The different space requirements of two embodiments of the support device 19 of the aircraft fuselage 3 and of the module 35 are illustrated in FIGS. 3A and 3B.

FIGS. 3A and 3B show a part of the section of the lower deck 15 from FIG. 2. Here, FIG. 3A shows a support device 19 according to the disclosure herein, which is fastened by its upper end 23 to the intermediate floor 11 at an upper installation point 49. Furthermore, the support device 19 is fastened by its lower end 25 to the fuselage structure 5 at a lower installation point 51. Furthermore, a direct linear connection 53 is shown between the upper and lower installation points 49, 51, which connection may represent a direct linear support device in the prior art. Finally, the space 55a freed up by the concave form of the support device 19 according to the disclosure herein in relation to the direct linear connection 53 is illustrated in FIG. 3A by hatching.

A similar space advantage is also obtained with the module 35 in FIG. 3B. In FIG. 3B, the upper end 41 of the module 35 is fastened to the intermediate floor 11 at an upper installation point 57. The lower end 43 of the module 35 is fastened to a lower installation point 59 of the fuselage structure 5. In this case, too, a direct linear connection 53 is shown, which may correspond to a linear support device from the prior art. The module 35 furthermore has a stowage compartment 61. As in FIG. 3A, the space 55b no longer required, and freed up in relation to the direct linear connection 53, by the module 35 is illustrated in FIG. 3B by hatching. It is to be noted that the hatching emphasises only the "open" free space. In addition to this "open" space, that is to say space which is directly accessible from outside the module 35, there is also the stowage compartment 61. In the stowage compartment 61, it is, for example, possible for items of luggage to be stowed by passengers, or the stowage compartment may serve as a waste bin.

The hatched areas in FIGS. 3A and 3B clearly show the space advantage, that is to say space gain, achieved by the support device 19 according to the disclosure herein of the aircraft fuselage 3 or by the module 35.

Figure 4:
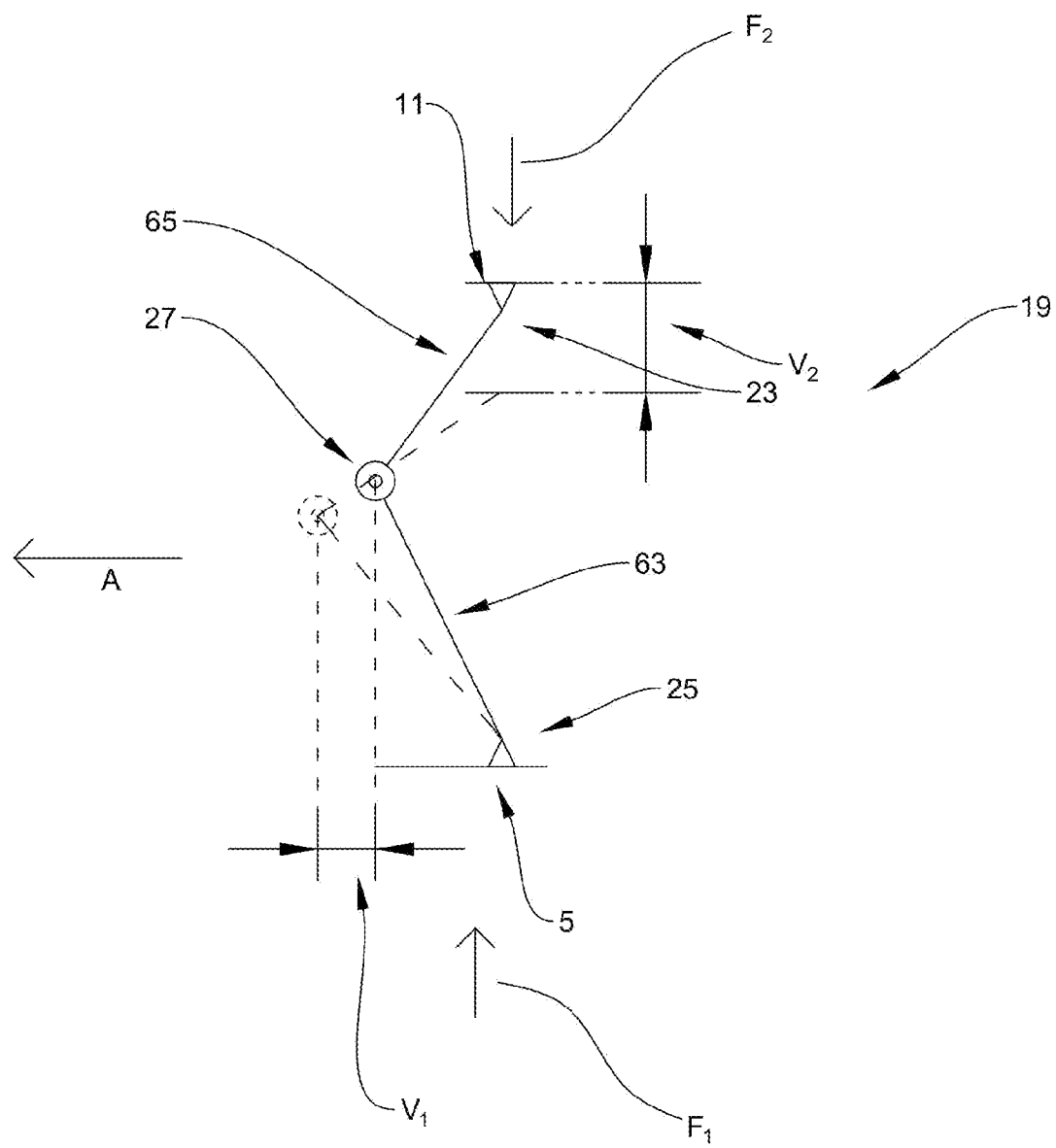
FIG. 4 is a schematic illustration showing the functioning of the support device of the aircraft fuselage and/or module according to the disclosure herein.

FIG. 4 shows a schematic construction of an embodiment of a support device 19 of the aircraft fuselage 3 according to the first aspect of the disclosure herein. Here, the support device 19 has at least one first support element 21. The first support element 21 has a lower section 63 and an upper section 65, which are connected by the energy absorption element 27. The lower section 63 has the lower end 25. The lower end 25 is fastened to the fuselage structure 5 at the lower installation point 51. The upper end 23 is fastened to the intermediate floor 11 at the upper installation point 49.

The energy absorption element 27 shown in FIG. 4 is a discrete energy absorption element 27. A discrete energy absorption element 27 is an energy absorption element 27 which extends only in a spatially very limited region, for example, the region of a joint, of a connecting or coupling point, between the upper and lower end 43 of the support element 21. Thus, the absorption of the kinetic energy and thus the plastic deformation take place in a locally concentrated manner in a discrete and particular region of the support element 21.

The discrete energy absorption element 27 functions as follows. In the event of a crash of the underside 29 of the aircraft fuselage 3, the support element 21 is subjected to a force F1. Since the support element 21 is connected both to the fuselage structure 5 and to the intermediate floor 11, and the intermediate floor 11 acts as counterbearing, the support element 21 is subjected to an opposing force F2 substantially opposite to the force F1. Furthermore, the energy absorption element, because of its capability to absorb kinetic energy, offers a further opposing force component, which together with the opposing force F2 forms the total opposing force.

In the event of a crash, the energy absorption element 27 absorbs kinetic energy and is thus deformed in a direction A away from the longitudinal axis L. This results in a movement of the support element 21, directed in a direction A away from the longitudinal axis L, with a horizontal offset V1 and a vertical offset V2. After the support element 21 has absorbed the defined energy, it assumes the position illustrated by dashed lines in FIG. 4. In this case, the energy absorption element 27 of the support element 21 of the support device 19 has absorbed such an amount of energy that a minimum height MH has not been undershot in the lower deck 15 of the aircraft fuselage 3, and the passengers present therein thus have a considerable likelihood of survival.

Figure 5:
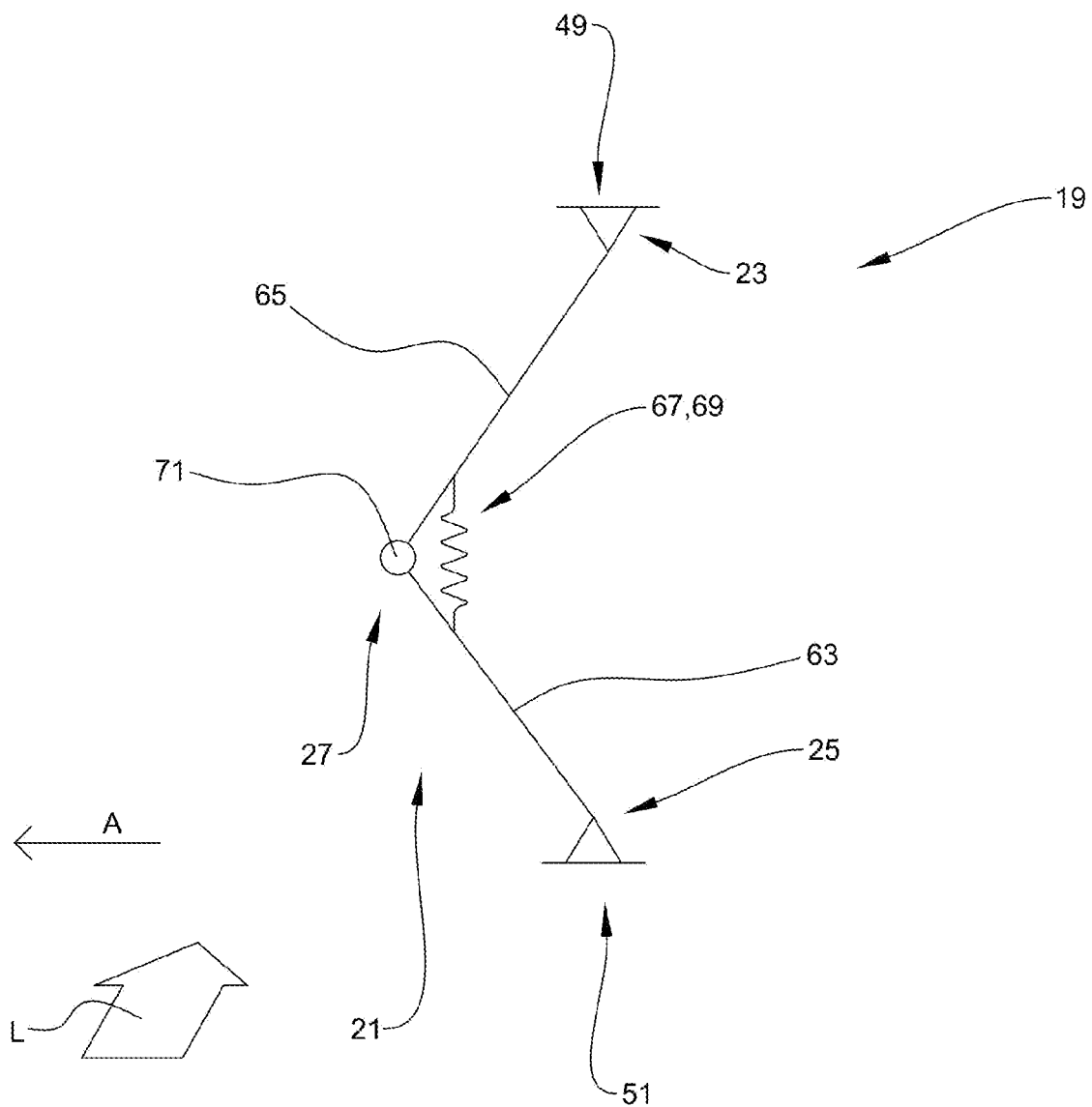
FIGS. 5-12 show preferred embodiments of the support device of the aircraft fuselage and/or module according to the disclosure herein.

FIG. 5 shows a further embodiment of the support element 21, shown schematically in FIG. 4, of the support device 19 of the aircraft fuselage 3 according to the first aspect of the disclosure herein.

Here, the support element 21 has an energy absorption element 27 with a spring element 67 which, beyond the elastic range, is plastically deformable. It is also conceivable for the support element to have at least one damper element 69, with which the spring element 67 is combined for the purposes of absorbing energy.

Furthermore, the lower section 63 and the upper section 65 are connected to one another in articulated fashion, that is to say by a joint 71, wherein the spring element 67 has a rotary spring at the joint 71. The spring element 67 may also have a linear compression spring which is fastened, spaced apart from the joint 71, between the lower and upper sections 63, 65.

Figure 6:
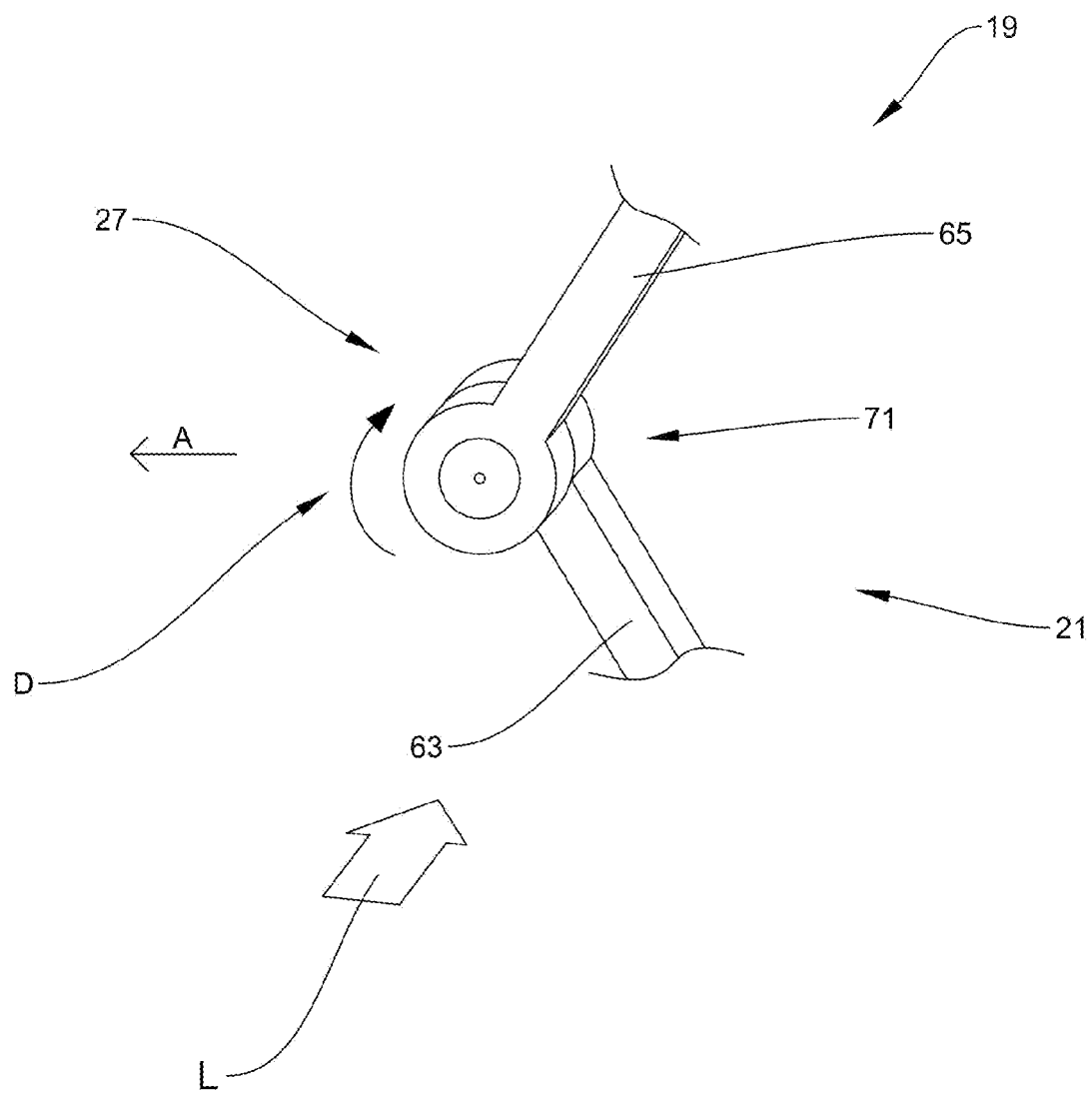

FIG. 6 shows a further embodiment of the support element 21, schematically shown in FIG. 4, of the support device 19 of the aircraft fuselage 3 according to the first aspect of the disclosure herein.

In the case of the support element 21, the energy absorption element 27 has a torsion element 73. The torsion element 73 is attached between an upper end 23 of the lower section 63 and a lower end 25 of the upper section 65 of the support element 21. Furthermore, in the event of a relative rotational movement of the lower and upper sections 63, 65 with respect to one another, the torsion element 73 is twisted and in the process plastically deformed.

Figure 7:
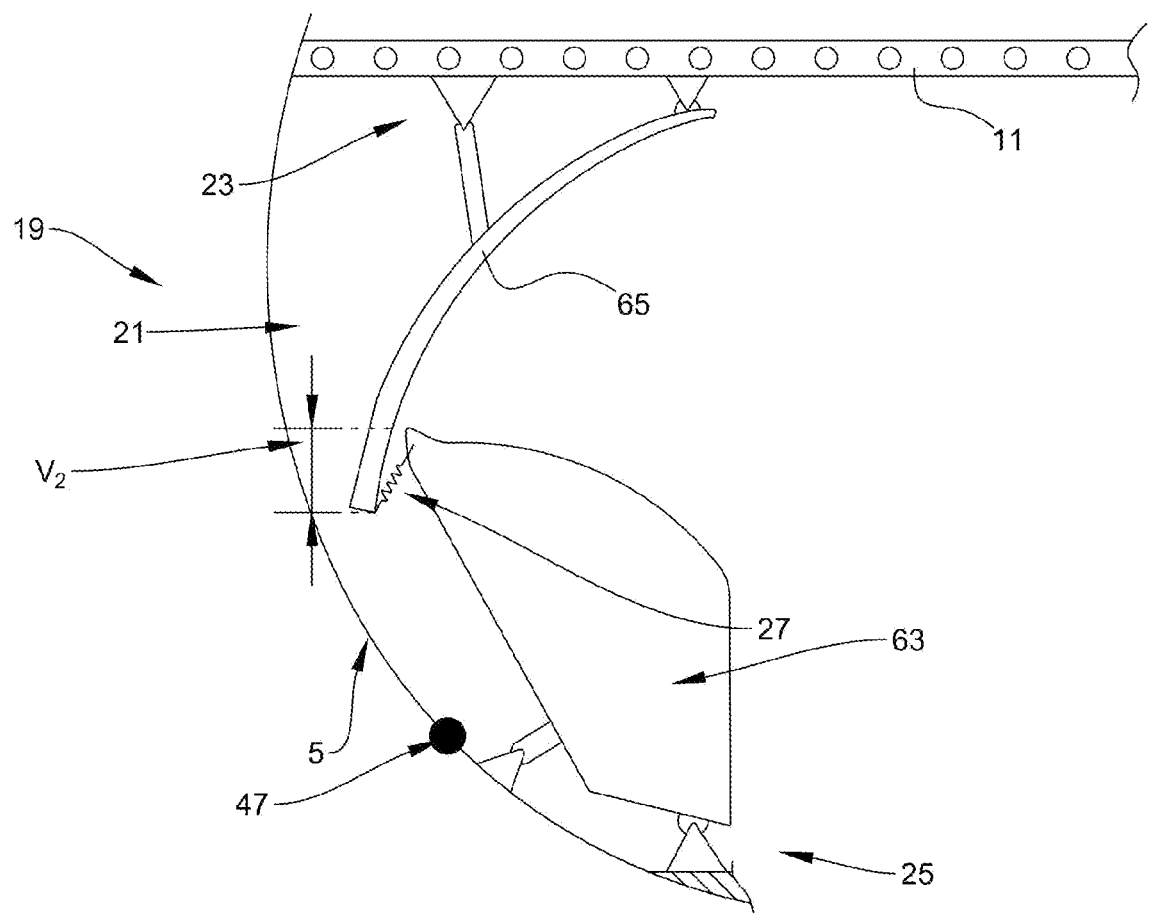

FIG. 7 shows a further embodiment of the support element 21, schematically shown in FIG. 4, of the support device 19 of the aircraft fuselage 3 according to the first aspect of the disclosure herein.

In this embodiment, too, at least one first support element 21 has a discrete energy absorption element 27 which connects a lower section 63 to an upper section 65. The lower section 63 has the lower end 25 and the upper section 65 has the upper end 23 of the support device 19.

Furthermore, the lower section 63 and the upper section 65 partially overlap, such that an upper end of the lower section is situated above a lower end of the upper section. The spring element 67 comprises a linear tension spring 75, which connects the upper end of the lower section and the lower end of the upper section and which, in the event of a relative movement of the lower and upper sections 63, 65 with respect to one another, is subjected to tensile load and in the process absorbs energy.

Finally, the fuselage structure 5 of the aircraft fuselage 3 has an energy absorption region. The energy absorption region is provided as a predetermined buckling line 47 parallel to the longitudinal axis L and is designed to, in the event of a crash, undergo plastic deformation and absorb energy. Here, the predetermined buckling line 47 is provided above the position at which the support device 19 is fastened to the fuselage structure 5.

Figure 8:
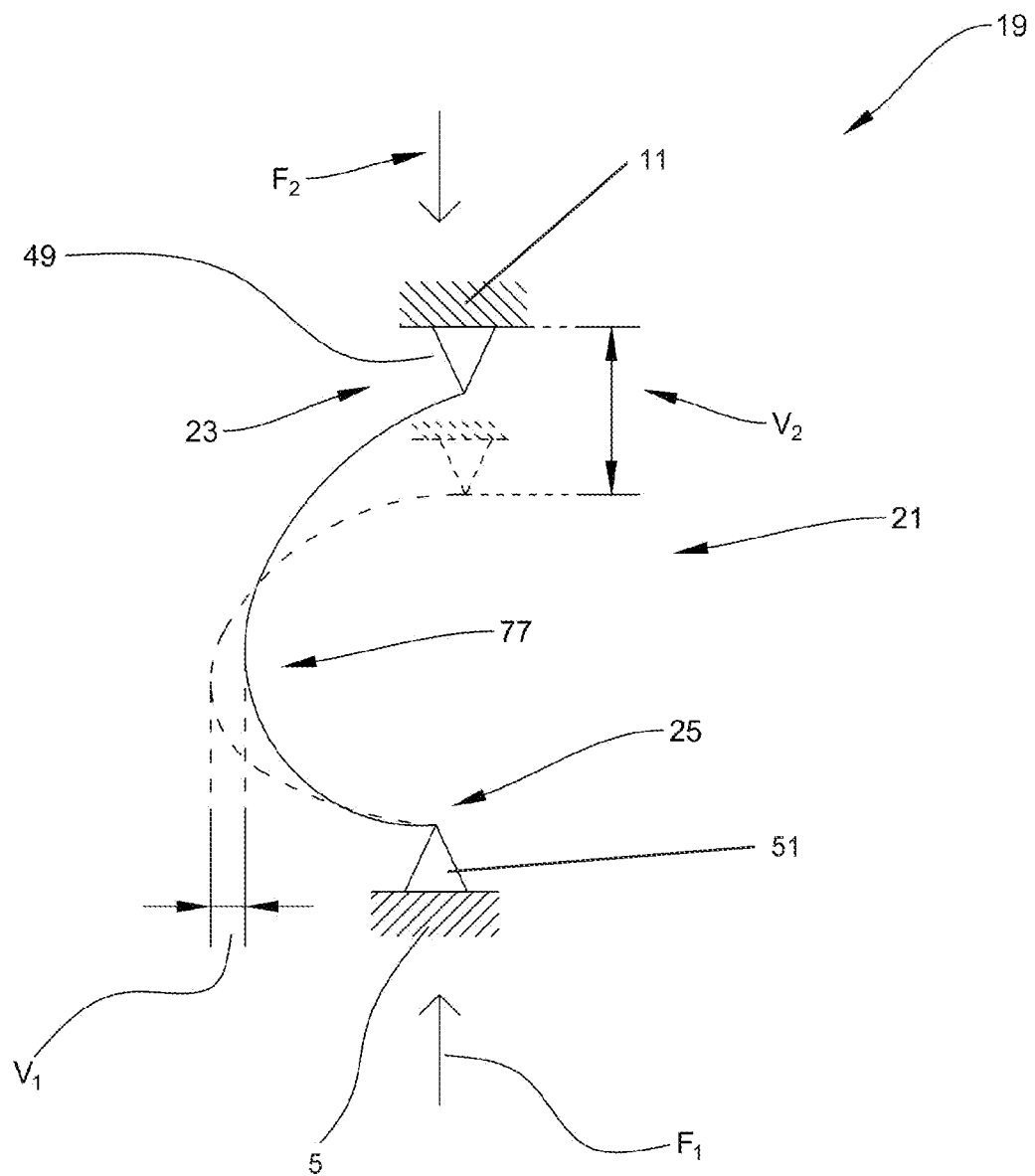

FIG. 8 shows an embodiment of a support element 21 of the support device 19 of the aircraft fuselage 3 according to the first aspect of the disclosure herein. In this embodiment, the support device 19 has at least one first support element 21 with a continuous energy absorption element 27. The continuous energy absorption element 27 is distributed continuously, for example in the form of an arc 77, at least over a part of the length, preferably over the entire length, of the support element 21 between the upper and lower ends 23, 25 of the support device 19. The support element 21 is, at its upper end 23, fastened to the intermediate floor 11 by an upper installation point 49. Furthermore, the support element 21 is, at its lower end 25, connected to the fuselage structure 5 by a lower installation point 51.

A continuous energy absorption element 27 is an energy absorption element 27 which extends over a major section, or even completely, between the upper and lower ends 23, 25 of the support element 19. In this way, the absorption of the kinetic energy and thus the plastic deformation take place in a manner distributed globally and thus continuously over the region of the energy absorption element 27 of the support element 21. In other words, the support element 21 itself, or parts thereof, can be designed to be plastically deformable and adapted so as to absorb energy by plastic deformation.

The continuous energy absorption element 27 functions as follows. In the event of a crash of the underside 29 of the aircraft fuselage 3, the support element 21 is subjected to a force F1. Since the support element 21 is connected both to the fuselage structure 5 and to the intermediate floor 11, and the intermediate floor 11 acts as counterbearing, the support element 21 is subjected to an opposing force F2 substantially opposite to the force F1. Furthermore, the energy absorption element, because of its capability to absorb kinetic energy, offers a further opposing force component, which together with the opposing force F2 forms the total opposing force.

In the event of a crash, the energy absorption element 27 absorbs kinetic energy and is thus deformed continuously in a direction A away from the longitudinal axis L. This results in a movement of the support element 21, directed in a direction A away from the longitudinal axis L, with a horizontal offset V1 and a vertical offset V2. After the support element 21 has absorbed the defined energy, it assumes the position illustrated by dashed lines in FIG. 8. In this case, the energy absorption element 27 of the support element 21 of the support device 19 has absorbed such an amount of energy that a minimum height MH has not been undershot in the lower deck 15 of the aircraft fuselage 3, and the passengers present therein thus have a considerable likelihood of survival.

Furthermore, in the event of a relative movement of the support element 21 with respect to the intermediate floor 11 and/or the fuselage structure 5, the energy absorption element 27 can be compressed between these and in the process be plastically deformed, absorbing energy.

Figure 9:
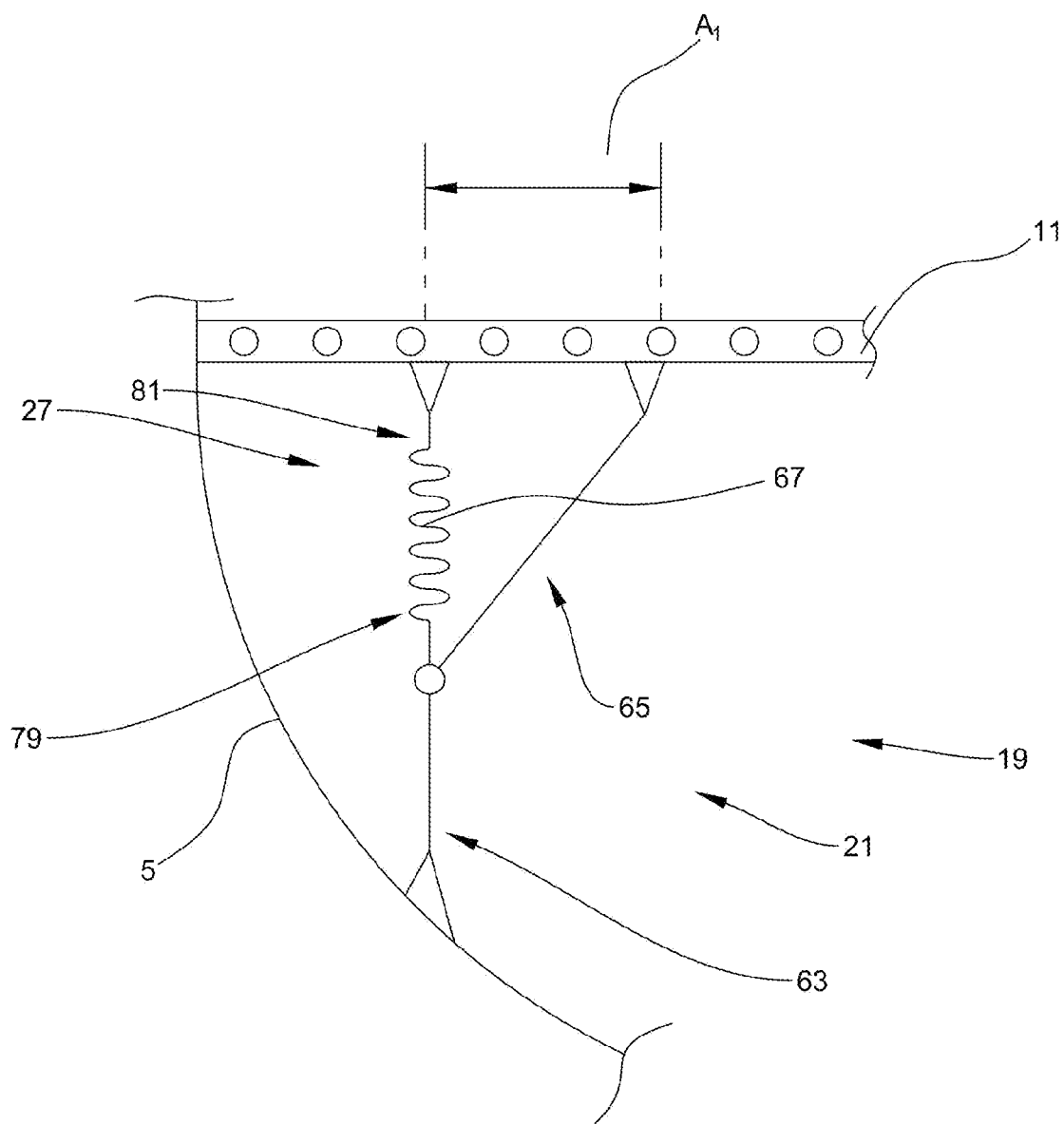

FIG. 9 shows an embodiment of a support element 21 of the support device 19 of the aircraft fuselage 3 according to the first aspect of the disclosure herein.

In this embodiment, at least one first support element 21 has an externally supported energy absorption element 27. This externally supported energy absorption element 27 is fastened, at a first end 79, to the support element 21. Furthermore, the energy absorption element 27 is connected, at a second end 81, to the intermediate floor 11 or to the fuselage structure 5.

Furthermore, the energy absorption element 27 has a linear spring element 67, which is plastically deformable beyond the elastic range. The spring element 67 is formed as a compression spring which is connected at the one, first end 79 to the support element 21 and at an opposite, other, second end 81 to the intermediate floor 11. The spring element 67 may however also be formed as a tension spring, which is connected at a first end 79 to the support element 21 and at an opposite, other, second end 81 to the fuselage structure 5.

Figure 10:
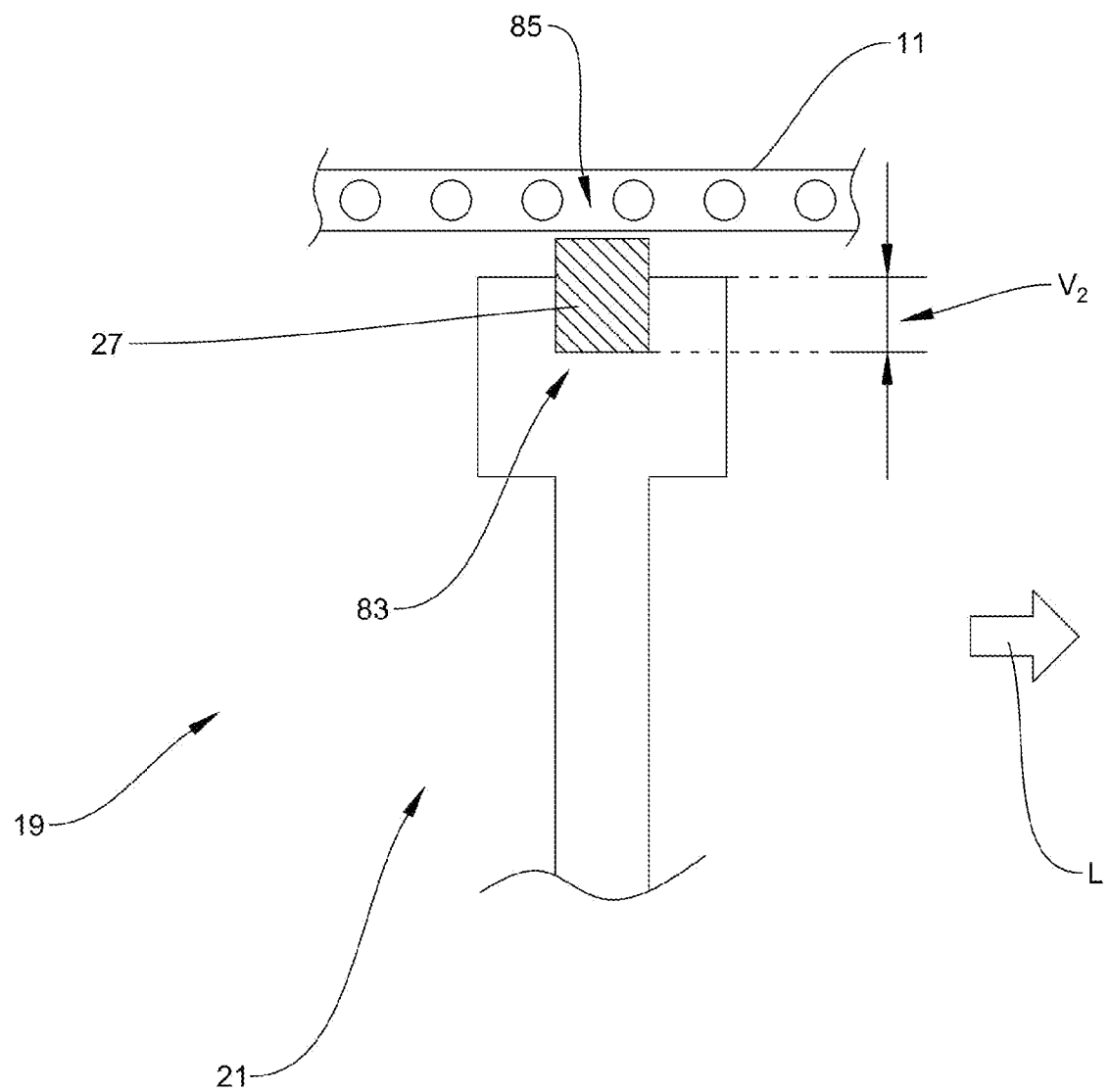
Figure 11:
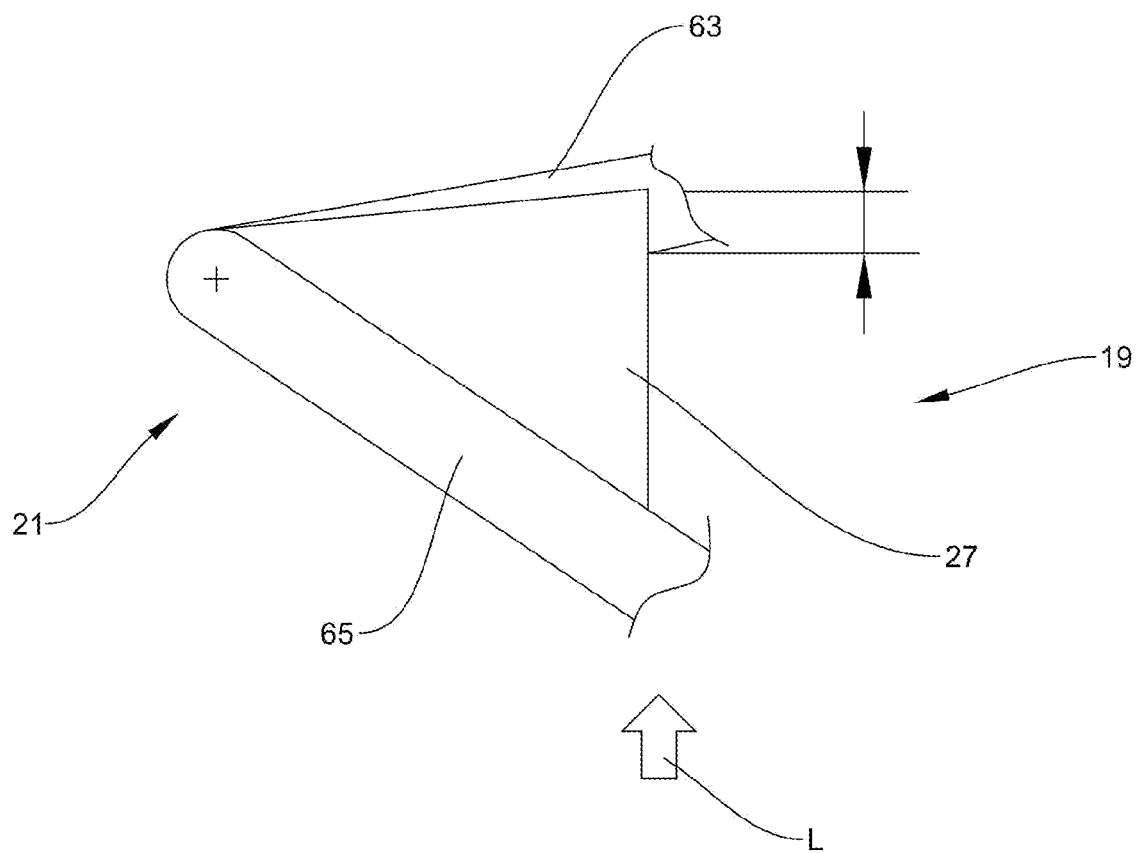

FIGS. 10 and 11 each show a further embodiment of the support device 19, shown in FIG. 9, of the aircraft fuselage 3 according to the first aspect of the disclosure herein.

In the embodiment in FIG. 10, the energy absorption element 27, which is designed as a so-called crash element, lies continuously against the surface 83 of the support element 21 and against the surface 85 of the intermediate floor 11, such that, in the event of a relative movement of the support element 21 with respect to the intermediate floor 11, the energy absorption element 27 is compressed between these and in the process is plastically deformed, absorbing energy.

In the embodiment in FIG. 11, the energy absorption element 27 is likewise designed as a crash element. The energy absorption element 27 is arranged between the lower section 63 and the upper section 65 of the support element 21 such that, in the event of a crash, the crash element is plastically deformed as a result of a relative movement of the lower and upper sections 63, 65, and thus absorbs kinetic energy from the crash.

Figure 12:
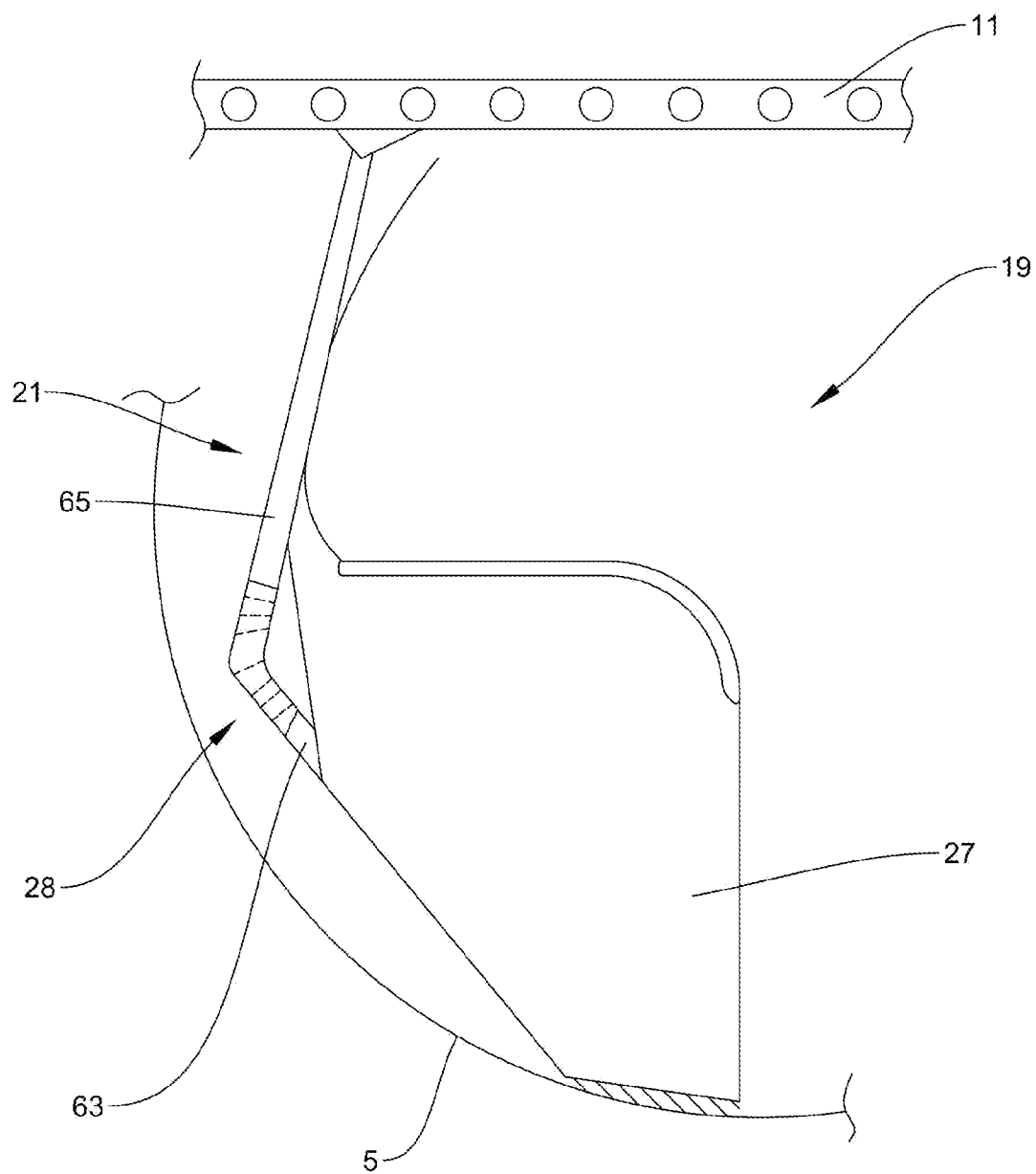

FIG. 12 shows a further embodiment of the support device 19, shown in FIG. 9, of the aircraft fuselage 3 according to the first aspect of the disclosure herein. In this embodiment, the energy absorption element 27 lies continuously against the surface of the support element 21 and against the surface of the fuselage structure, and may likewise be designed as a crash element. In this way, in the event of a relative movement of the support element 21 with respect to the fuselage structure 5, the energy absorption element 27 can be compressed between these and in the process be plastically deformed, absorbing energy. It is furthermore also conceivable that, in addition to the energy absorption element 27 designed as a crash element, a further energy absorption element 28 is provided. The further energy absorption element may, for example, connect the upper and lower sections 65, 63 of the support element to one another.

Figure 13:
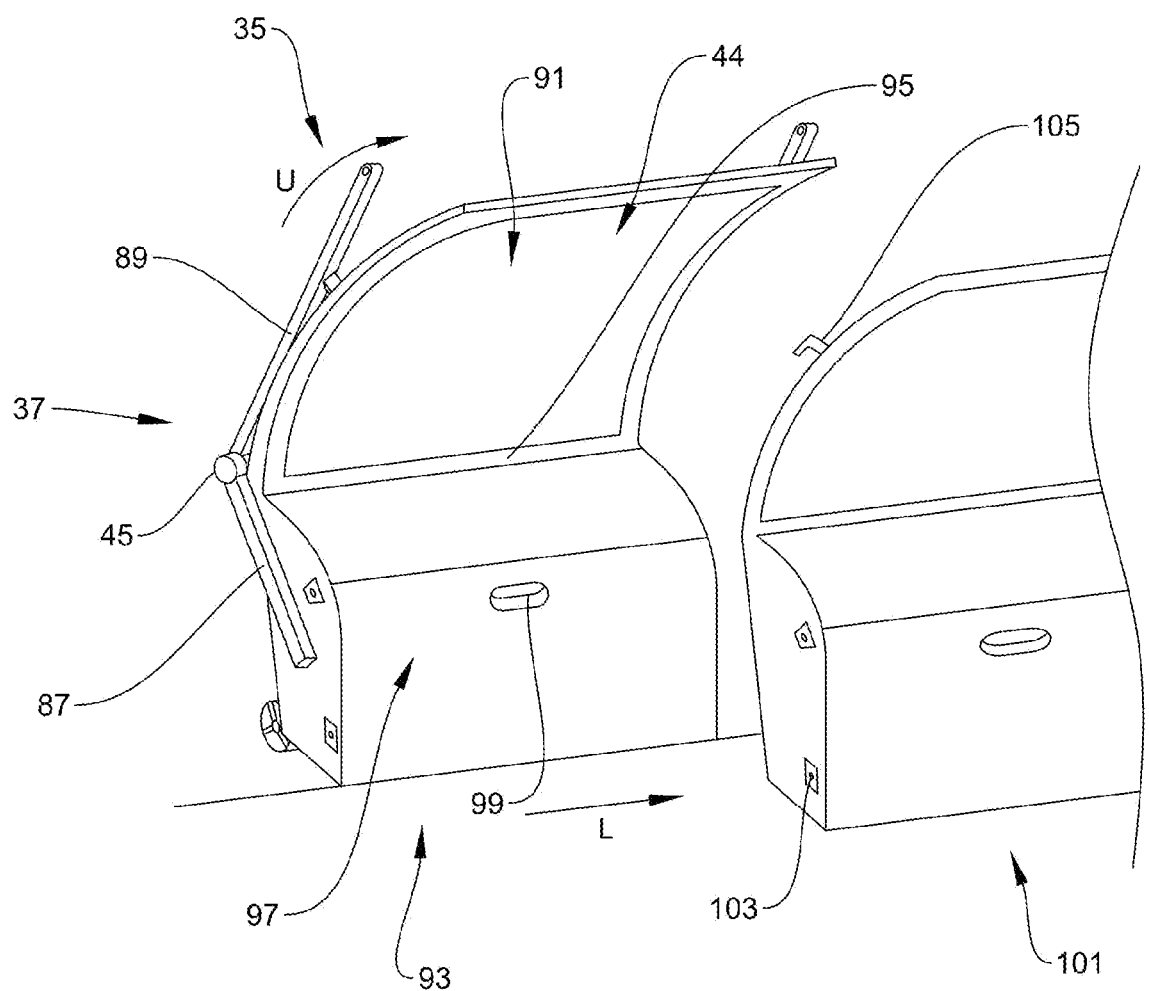
FIG. 13 shows a preferred embodiment of a module according to the disclosure herein during assembly with a second module.

FIG. 13 shows an embodiment of a module 35 according to the second aspect of the disclosure herein.

The module 35 has a support device 37 and a wall panel 44, which extends along a longitudinal axis L and along a circumferential direction U. The support device 37 has a lower end 87 and an upper end 89. The lower end 87 is designed to be connected to a fuselage structure 5 in a lower deck 15 of the aircraft fuselage 3. The upper end 89 is designed to be connected to an intermediate floor 11 in the aircraft fuselage 3. The wall panel 44 is furthermore connected to the support device 37. The support device 37 has a concave form as viewed from the longitudinal axis L.

Furthermore, between the upper end 89 and the lower end 87, there is arranged an energy absorption element 45 which is designed such that, in the event of a defined crash of an underside 29 of the aircraft fuselage 3, when the module 35 is installed in an aircraft fuselage 3, the energy absorption element is subjected to a defined plastic deformation. As a result of the defined plastic deformation, a defined amount of kinetic energy of that part of the fuselage structure 5 which is connected to the lower end 87 of the support device 37 is absorbed. For this purpose, the lower end 87 of the support device 37 must be connected to the fuselage structure 5 in the lower deck 15 of the aircraft fuselage 3. Furthermore, the upper end 89 of the support device 37 must be connected to the intermediate floor 11 in the aircraft fuselage 3.

Furthermore, the wall panel 44 has an upper section 91 of the wall panel 44 and a lower section 93 of the wall panel 44. The upper section 91 of the wall panel 44 is movably connected to the lower section 93 of the wall panel 44 by a hinge region 95. In this way, in the event of a movement of the support device 37 in a direction away from the longitudinal axis L, the upper and lower sections 93, 95 of the wall panel 44 can follow this movement without breaking.

Furthermore, in the lower section 93 of the wall panel 44, there is provided a stowage compartment 97, which can be opened by a handle 99. It is, for example, possible for items of luggage belonging to the passengers to be stowed in the stowage compartment 97.

FIG. 13 furthermore shows a second module 101. The second module may be a module according to the second aspect of the disclosure herein. It is however also possible for the second module to merely have a wall panel 44 with an upper and lower section 91, 93 and with a stowage compartment 97 provided in the lower section 93. The second module 101 can be connected to the module 35 by a fastening device 103. Furthermore, the second module 101 (like the module 35) has a fastening device 105 for installation on the fuselage structure 5.

Figure 14:
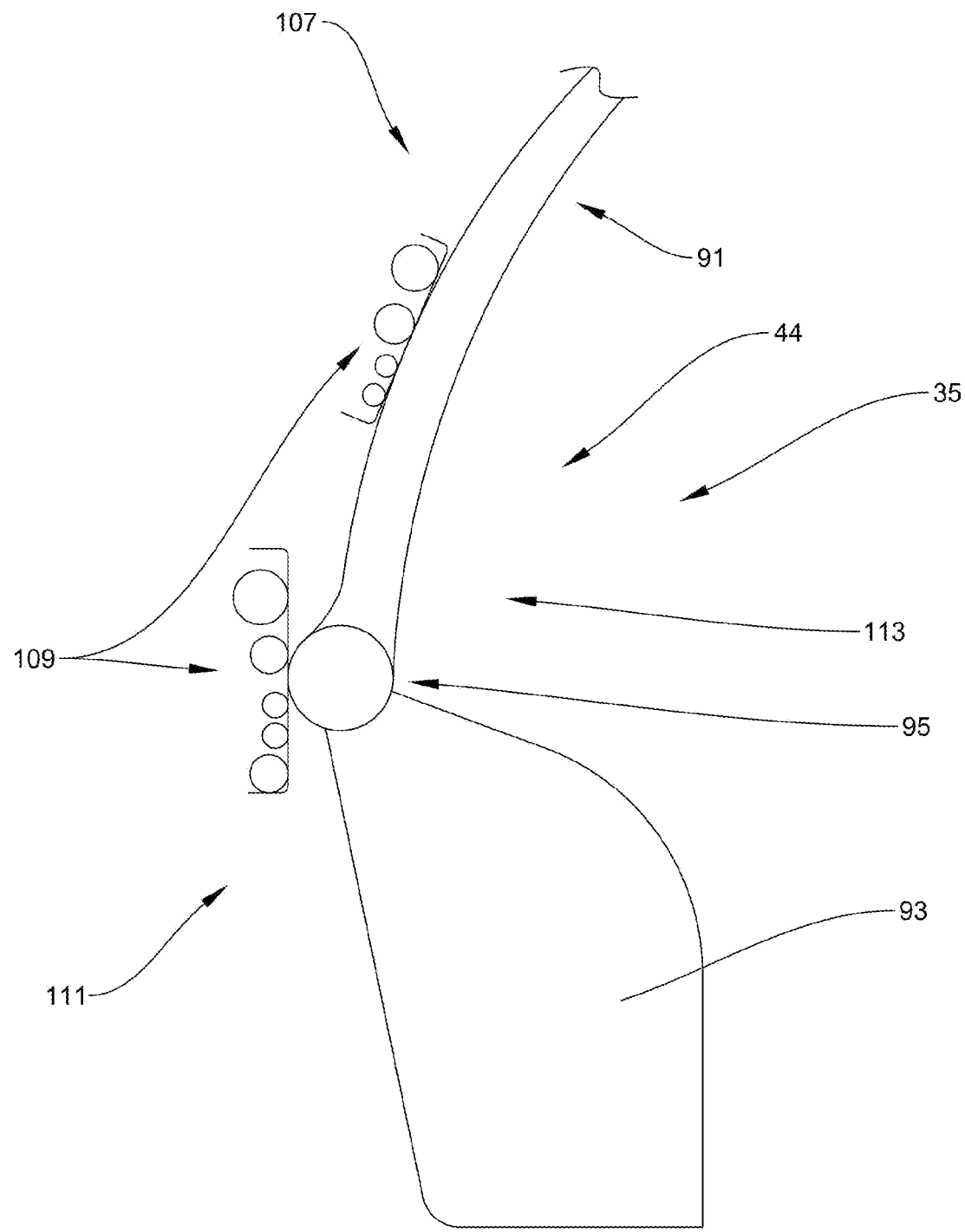
FIG. 14 shows a preferred embodiment of the module according to the disclosure herein with cable systems installed thereon.

FIG. 14 shows an embodiment of the module 35, shown in FIG. 13, according to the second aspect of the disclosure herein in a schematic detail view from a side elevation. The module 35 has a section 107, which provides at least one receptacle 109 and/or fastening for cables, lines and/or pipes. This section 107 is arranged on a rear side 111 of the wall panel 44. The rear side 111 of the wall panel 44 is in this case a surface of the wall panel 44 averted from the longitudinal axis L, and is situated opposite an inner side 113.

Figure 15:
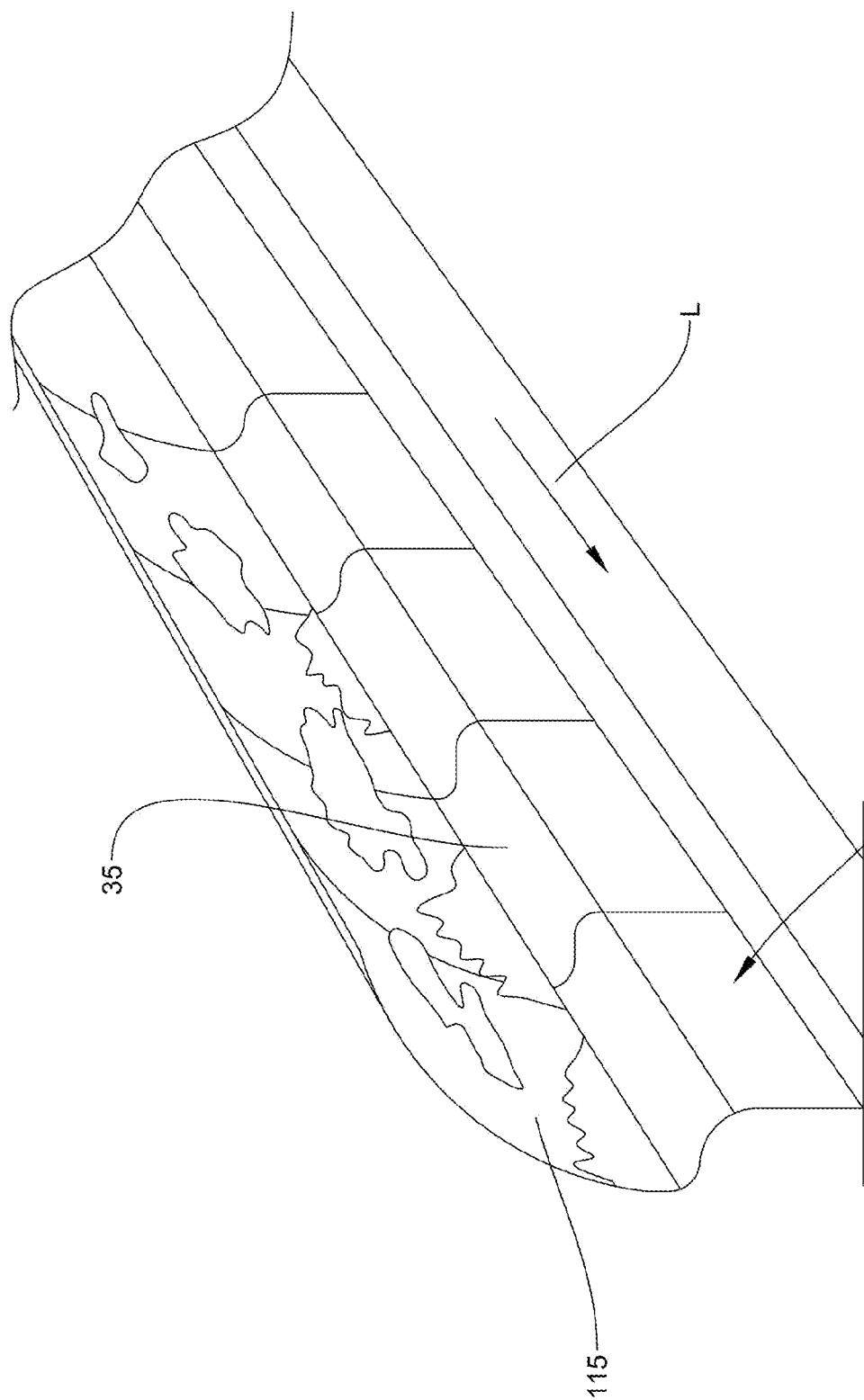
FIG. 15 shows a multiplicity of installed embodiments of the module according to the disclosure herein.

FIG. 15 likewise shows a multiplicity of embodiments of the module 35, shown in FIG. 13, according to the second aspect of the disclosure herein. In FIG. 15, multiple modules 35 have been fastened to one another. Furthermore, each module 35 has a display element 115. For example, exterior views of the aircraft 1 are displayed by the display element 115.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A module for installation into an aircraft fuselage, the module comprising:
 a support device comprising:
  a lower end configured for connection to a fuselage structure in a lower deck of the aircraft fuselage;
  an upper end configured for connection to an intermediate floor in the aircraft fuselage; and
  an energy absorption element between the upper end and the lower end;
 a wall panel which is connected to the support device and extends along a longitudinal axis and along a circumferential direction, wherein, as viewed from the longitudinal axis, the support device has a concave form;
 wherein the energy absorption element is configured such that, in an event of a crash of an underside of the aircraft fuselage in which the module is installed, the energy absorption element is configured to undergo a plastic deformation and, in so doing, absorb an amount of kinetic energy of that a part of the fuselage structure connected to the lower end of the support device;
 wherein the plastic deformation and the amount of kinetic energy are of such a magnitude that, in the event of the crash, the module is configured such that the fuselage structure will, at the underside of the aircraft fuselage, deform no more than a minimum height, which is defined as being between a seat surface of passenger seats provided in the lower deck and the intermediate floor.

2. The module of claim 1, wherein the energy absorption device comprises a spring element.

3. The module of claim 1, wherein the energy absorption device comprises a damper element.

4. The module of claim 1, wherein the support device comprises a support element, which has an upper section and a lower section, the upper end of the support device being defined at a distal end of the upper section and the lower end of the support device being defined at a distal end of the lower section.

5. The module of claim 4, wherein the support element comprises a joint that attaches, in an articulated manner, a proximal end of the upper section to a proximal end of the lower section.

6. The module of claim 5, wherein the energy absorption element comprises a rotary spring and is in or adjacent to the joint.

7. The module of claim 6, wherein the energy absorption element comprises a linear compression spring that is fastened between the lower section and the upper section.

8. The module of claim 7, wherein the linear compression spring is spaced apart from the joint.

9. The module of claim 5, wherein the energy absorption element comprises a linear compression spring that is fastened between the lower section and the upper section.

10. The module of claim 9, wherein the linear compression spring is spaced apart from the joint.

11. The module of claim 5, wherein the energy absorption unit comprises a torsion element that is attached between an upper end of the lower section and a lower end of the upper section, the torsion element being configured such that, when there is a relative rotational movement between the lower section and the upper section, the torsion element is configured to twist and be plastically deformed.

12. The module of claim 11, wherein the torsion element is in the joint.

13. The module of claim 5, wherein:
 the energy absorption element comprises a compression spring and is attached, at a first end thereof, to or adjacent to the joint and is configured for attachment, at a second end thereof, to the intermediate floor of the aircraft fuselage; or
 the energy absorption element comprises a tension spring and is attached, at a first end thereof, to or adjacent to the joint and is configured for attachment, at a second end thereof, to the fuselage structure.

14. The module of claim 4, wherein:
 the upper section and the lower section at least partially overlap each other, such that an upper end of the lower section is vertically higher than the lower end of the upper section;
 the energy absorption element comprises a linear tension spring extending between and connecting together the upper end of the lower section and the lower end of the upper section; and
 the linear tension spring is configured such that, when there is a relative movement between the lower section and the upper section, the linear tension spring is subjected to a tensile load and, as a result of being subjected to the tensile load, absorbs at least some of the amount of kinetic energy.

15. The module of claim 4, wherein the energy absorption element is positioned continuously against a surface of the lower section of the support element and is configured for being positioned against a surface of the fuselage structure, the energy absorption device being configured such that, when the support device moves relative to the fuselage structure, the energy absorption device is compressed therebetween and is subjected to plastic deformation, thereby absorbing at least some of the amount of kinetic energy.

16. The module of claim 15, wherein the support device comprises a further energy absorption device that connects a proximal end of the lower section of the support element to a proximal end of the upper section of the support element.

17. The module of claim 1, wherein the energy absorbing element is a continuous energy absorption element in a form of a support element that extends continuously between the upper end of the support device and the lower end of the support device, the support element having a shape such that, in the event of the crash, the support element is configured to plastically deform and, thus, to absorb at least some of the amount of kinetic energy.

18. The module of claim 17, wherein the shape of the support element is an arc extending over at least a part of a length of the support element.

19. The module of claim 17, wherein the shape of the support element is an arc extending over an entire length of the support element.

20. An aircraft comprising a module according to claim 1.

* * * * *